US012482329B2

(12) United States Patent
Enzminger et al.

(10) Patent No.: US 12,482,329 B2
(45) Date of Patent: Nov. 25, 2025

(54) SYSTEM AND METHOD FOR LIVE PARI-MUTUEL WAGERING ON MULTIPLE PAST EVENTS

(71) Applicant: Exacta Systems, LLC, Boynton Beach, FL (US)

(72) Inventors: Joseph R. Enzminger, Austin, TX (US); Jefferson C. Lind, Austin, TX (US); Nimai Malle, Austin, TX (US); Glen M. Rose, Boca Raton, FL (US); Jeremy F. Stein, Wellington, FL (US); Katherine M. Paisley, Lake Worth Beach, FL (US); Patrick Neely, Littleton, CO (US)

(73) Assignee: Exacta Systems, LLC, Louisville, KY (US)

( * ) Notice: Subject to any disclaimer, the term of this patent is extended or adjusted under 35 U.S.C. 154(b) by 309 days.

(21) Appl. No.: 18/025,260

(22) PCT Filed: Sep. 24, 2021

(86) PCT No.: PCT/US2021/051958
§ 371 (c)(1),
(2) Date: Mar. 8, 2023

(87) PCT Pub. No.: WO2022/067040
PCT Pub. Date: Mar. 31, 2022

(65) Prior Publication Data

US 2024/0013616 A1 Jan. 11, 2024

Related U.S. Application Data

(60) Provisional application No. 63/083,459, filed on Sep. 25, 2020.

(51) Int. Cl.
*G07F 17/32* (2006.01)

(52) U.S. Cl.
CPC ...... *G07F 17/3237* (2013.01); *G07F 17/3209* (2013.01); *G07F 17/3211* (2013.01);
(Continued)

(58) Field of Classification Search
None
See application file for complete search history.

(56) References Cited

U.S. PATENT DOCUMENTS 11,521,463 B1 * 12/2022 Higgins .............. G07F 17/3211
11,710,383 B2 * 7/2023 Fulton ................. G07F 17/3213
463/20

(Continued)

OTHER PUBLICATIONS

PCT/US2021/051958 International Search Report and Written Opinion dated Jan. 28, 2022.

*Primary Examiner* — Ronald Laneau
(74) *Attorney, Agent, or Firm* — Woodard Emhardt Henry Reeves & Wagner LLP

(57) ABSTRACT

A system for facilitating live pari-mutuel betting between multiple individuals betting on the outcome of historical events. Player prizes may be awarded based on how closely each player comes to matching the actual results of the participants of the events. The system may provide multiple different bets for players to wager on. Each bet may include a collection of multiple events, and a deadline for determining the outcome of the wagers placed by all players. Higher payouts may be offered for players who more closely match the actual outcomes of the events. The system optionally includes different configurations of software and hardware providing a variety of different configurations for facilitating the disclosed process.

23 Claims, 13 Drawing Sheets

(52) U.S. Cl.
CPC ...... *G07F 17/3258* (2013.01); *G07F 17/3267* (2013.01); *G07F 17/3276* (2013.01); *G07F 17/3288* (2013.01)

(56) References Cited

U.S. PATENT DOCUMENTS

| | | | | |
|---|---|---|---|---|
| 2003/0003990 | A1 | 1/2003 | Von Kohorn | |
| 2008/0113816 | A1* | 5/2008 | Mahaffey | G07F 17/329<br>463/13 |
| 2013/0337914 | A1 | 12/2013 | Kelly et al. | |
| 2019/0147530 | A1 | 5/2019 | Amaitis et al. | |
| 2019/0221081 | A1 | 7/2019 | Miller et al. | |
| 2019/0325707 | A1 | 10/2019 | Aronson et al. | |
| 2019/0333338 | A1* | 10/2019 | Hirsch | G07F 17/3288 |

* cited by examiner

SYSTEM AND METHOD FOR LIVE PARI-MUTUEL WAGERING ON MULTIPLE PAST EVENTS

BACKGROUND

The disclosed system and related methods of operation generally relate to live pari-mutuel wagering on multiple past events. Such events may include, for example, multiple horse races, automobile races, golf matches, or any other suitable event.

SUMMARY

Disclosed is a system configured to facilitate pari-mutuel betting on multiple historical events. The system optionally provides for multiple players to have the opportunity to bet against each other on the outcome of the same historical events. The time, place, participants, etc. of the historical events players are betting on are withheld until after the results of the wagers placed are calculated. Player prizes may be awarded based on how closely the players come to picking the outcome for the participants of each event that occurred in the past. For example, players whose bets closely match the outcome of the historical events may win higher payouts, while players with fewer matches to the actual outcome may receive lower payouts, if any at all.

As explained in further detail herein, the system may include processors or computers. (e.g. personal computing devices, servers, databases, and/or wagering terminals) configured to communicate with one another via one or more communication links implemented in any suitable manner such as by wired, or wireless, computer networks. These communications links may be useful for providing connectivity and thereby facilitating interactions between the components of the system In another aspect, wagers made by the players are optionally included into one or more pools managed by the system to provide a pari-mutuel wagering environment. These common pools may then be used by the system to pay out winnings to the participants. The system may optionally include a totalizator aspect configured to accept and process wagers, make pool allocations, calculating the odds and prices of the wagers, calculate commissions, and distribute winnings. The system may optionally maintain multiple math models and separate pari-mutuel wagering pools for different denominations and bet levels offered by the disclosed system according to the different math models.

In another aspect, the system may be configured to create and manage multiple bets on multiple historical sporting events, and may assign an "execution time", which may also be thought of as an "expiration time", or a "post time", for each bet. The execution time may be initialized as some number of minutes, hours, days, etc. in the future. The system may offer players the option to participate in these bets by laying down a wager amount, and selecting the finishing order of the participants for the events of a particular bet, and then waiting until the execution time arrives, at which time the results of all wagers will be determined, and payouts made to each winning player. In another aspect, the system may continuously configure new bets with new events, and provide players with the opportunity to make new wagers on the new bets. Thus a player may repeatedly join other players in concurrently betting on the same groups of past events.

The disclosed system can also include wagering terminals configured to communicate with servers, databases, and/or a totalizator to allow players to participate in the disclosed pari-mutuel betting system. As disclosed herein elsewhere in further detail, players may use a "terminal" to select a bet, make a wager, and optionally accept a predetermined ranking provided by the system, and/or provide user input for manually ranking the results for participants in the past event(s). The terminal may optionally interact as need with other severs, databases, computing devices, and the like to provide additional details about the actual events such as short video clips, animations, or other information about the event.

Further forms, objects, features, aspects, benefits, advantages, and examples of the present disclosure will become apparent from the accompanying claims, detailed description, and drawings provided herewith.

DETAILED DESCRIPTION

Figure 1:
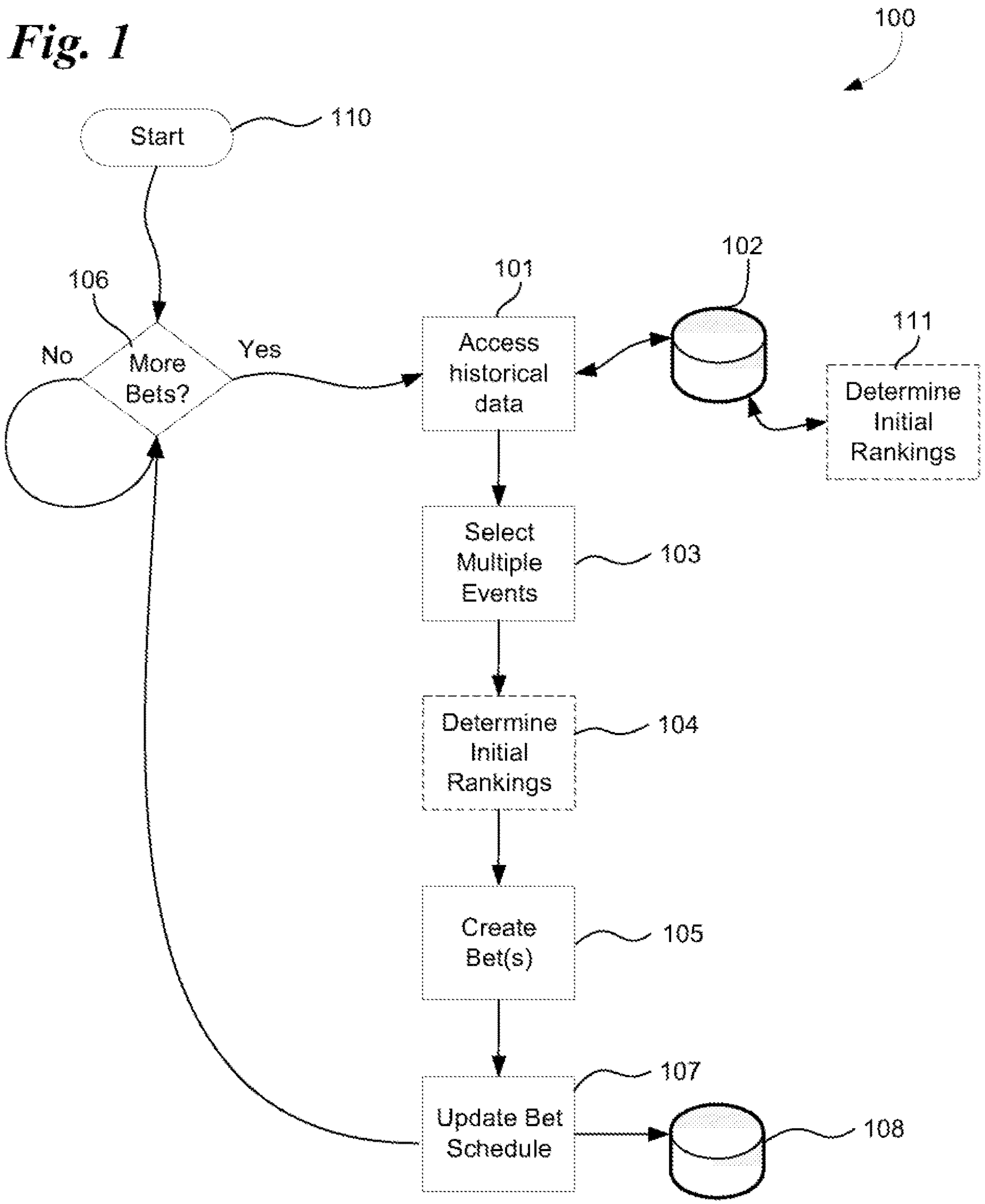
FIG. 1 is a flow chart illustrating aspects of a method of live pari-mutuel wagering on multiple past events.
Figure 2:
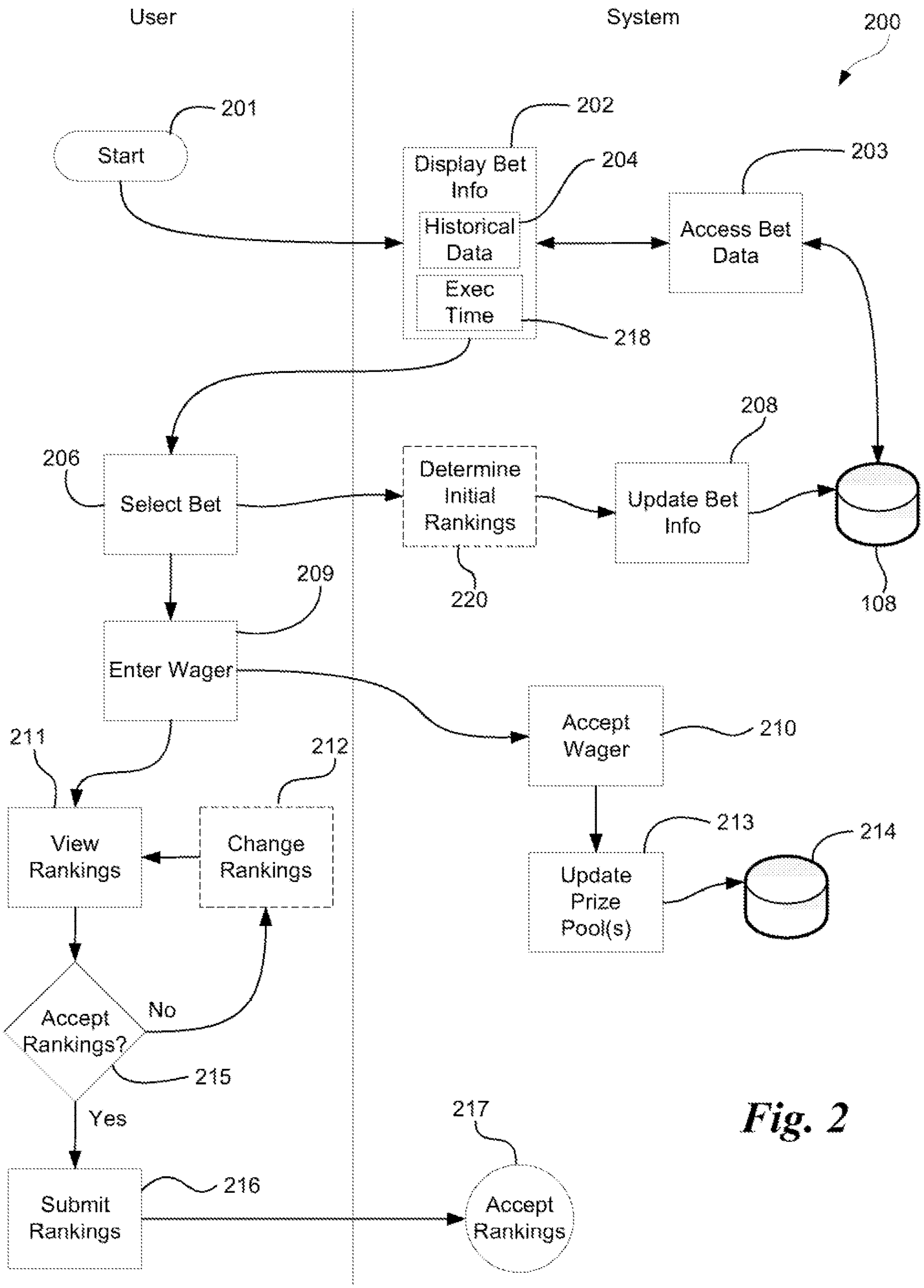
FIG. 2 is a flow chart illustrating additional aspects of the method of the present disclosure.
Figure 3:
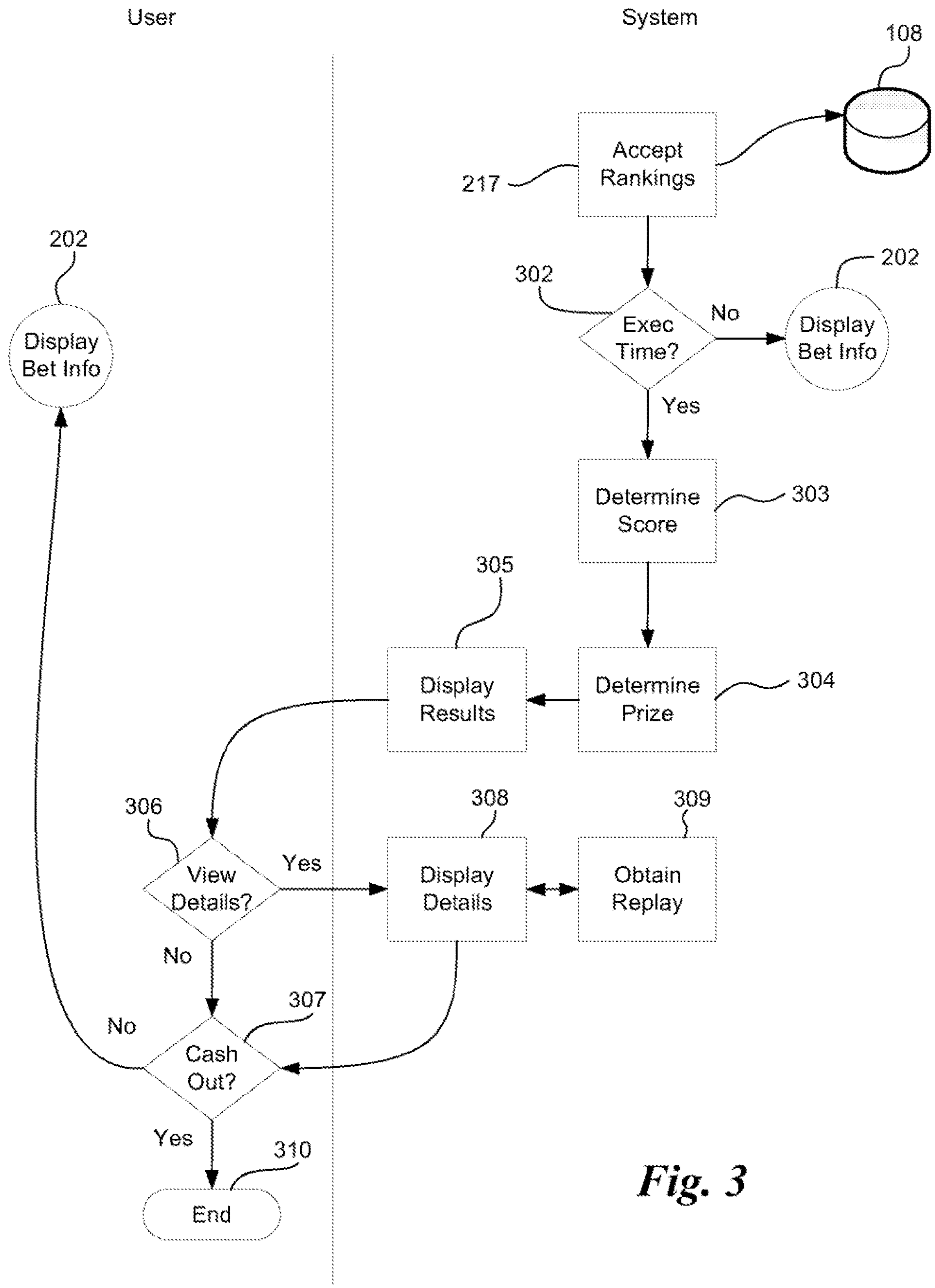
FIG. 3 is a flow chart illustrating additional aspects of the method of the present disclosure.

FIGS. 1-3 illustrate examples of aspects of the disclosed method of competitive live pari-mutuel betting on groups of multiple past events. Illustrated at 100 in FIG. 1 is one example of actions the system may take to prepare bets and configure the system to accept player wagers.

They system may start at 110 and proceed by determining if more bets should be prepared at 106. For example, the system may be configured to maintain a predetermined number of bets at all times in order to ensure players always have an opportunity to make wagers. The determination of how many bets to maintain as "active" for players to wager on may be a configuration detail specific to the constraints and limitations of the existing hardware, network, or other related aspects. Any suitable number of active bets may be maintained at any given time, and the number of active bets may be changed over time as needed in order to throttle activity on the overall system to match the number of players interested in playing to the available resources of the databases, servers, terminals, or other aspects of the system.

If more bets are needed at 106, the system optionally accesses historical data at 101 such as might be obtainable from an event database 102. In one aspect, the past event data is optionally stored in an electronic storage device mounted in a server remote from a terminal, within a terminal, or within a personal computing device.

In another aspect, the system may be configured or programmed to select multiple events at 103 from historical event data, such as the data obtained at 101. In one aspect, the system may be configured to retrieve historical event data for events that occurred in the past using one or more processors. These processors may be included in the control circuitry of one or more servers, game terminals, personal computing devices, or any combination thereof. In another aspect, the historical event data optionally includes final rankings for the event participants. The final ranking of the event participants may indicate the outcome for each of the event participants with respect to the other event participants who competed in the same historical event. In one aspect, the historical events are optionally retrieved from a remote server and/or a remote database that is accessible via a computer network. For example, a terminal, server, or computing device of the present disclosure may access the remote server and/or the remote database which may be "remote" in that they are physically separate from the terminal, server, or computing device.

Any suitable combination of events may be considered. The historical event data may include the finishing order for horses in a horse race (where each race is considered a separate event); the finishing order for drivers or cars in an automobile race (where each race is considered a separate event); the quarterback rankings for quarterbacks in a season for college, or National Football League (NFL) football (where each "event" is a football season); or the final standings for participants in a golf match (where each match is considered an "event", or where each day of a given match is considered an "event"). These are but a few nonlimiting examples.

In another aspect, the events may be selected by the system randomly, or according to selection rules programmed or configured to select events according to specific criteria, or any combination thereof. The rule criteria may include any suitable aspect of an event that might be useful for grouping events together for the purposes of allowing players to wager on the outcomes. Examples of such criteria include, but are not limited to the type of event, the date/time of the event in the past, the number and type of participants, the type of sporting event, and others, in any suitable combination thereof.

For example, the rules may be configured with criteria for selecting four events randomly from all horse races held on the same day at a particular horse racing venue (e.g randomly selecting four Kentucky Derby horse races held at Churchill Downs). In another example, the rules may include criteria for randomly selecting four Major League Baseball (MLB) games from all MLB games played in the past (e.g. randomly selecting four "game one" baseball games held in the past during a baseball World Series, or simply randomly selecting four baseball games held in the past). In another example, the rules may include criteria for selecting any three golf matches held in a particular year (e.g selecting any three first round matches from any golf tournament held in 1992).

In another example, the disclosed system may select from past event data that includes data about horse races that includes a race with at least 6 horse fields, where no horses scratched from the race, where there were no dead heats, where there were no coupled entries, and where all horses finished the race.

In another example, the system may select historical events where the events are team competitions, where the participants are teams of individual competitors, where the predicted ranking is a predicted outcome for the team in each of the team competitions, and where the final ranking is the actual outcome for the teams competing in their respective team competitions. Any suitable configuration of rules and rule criteria may be included.

The historical data optionally includes a final ranking for the respective multiple participants ranking the participants with respect to other participants who competed in the same event. For example, where the events are separate horse races, the participants are horses, and the final ranking for the respective participants in each event is determined by the finishing position in the field. Horses finishing first in the separate races are ranked higher than horses finishing subsequent to the first place finishers. A similar ranking system may be used to rank finishers in other kinds of events such as dog races, automobile races, swimming, track and field events, or other events where participants are ranked based on the order in which they cross a finish line (or put another way, in ascending order of the time it takes for the participants to navigate at least a portion of a particular course or track one or more times).

Other ranking systems may be used, such as rankings based on subjective performance metrics that are assigned by a judge, or panel of judges such as in gymnastics, figure skating, diving, and others. In another example, participants' final rankings may be provided in ascending order depending on the number of particular actions that must be taken such as in golf or in some types of target shooting sports using bows or guns. In yet another example, the participants may be teams with multiple individual team members performing various roles during the event such as baseball players or basketball players. In this example, the team may be ranked in descending order according to points scored, games won in a season, or number of times the team has won or lost against a particular opponent. Other metrics may not involve wins and losses but overall team performance such as the number of home runs hit, the number of three point shots made, and the like. Any suitable statistic collected or generated memorializing the performance of participants in an event may be used to rank the performance of participants in an event.

Database 102 may contain data about multiple events such as sporting events or any other suitable event that occurred in the past that fit specific criteria. For example, the data may include data about horse races such as races with ten horse fields where no horses were scratched from the race, where there were no dead heats, where there were no coupled entries, where all horses finished the race, where all horses had odds of winning (i.e. odds of having the highest final ranking) that were greater than 0 at the time of the race, or where the facility hosting the race was located within the borders of the United States, or any combination thereof. Any other criteria may be imposed.

Database 102 may also include race replay information such as video clips, or graphical representations of the results of various events. It may also include charts, graphs, statistical data, and the like explaining predicted results and actual final results for the participants in the events themselves.

In another aspect, the system may be optionally configured to determine initial rankings at 104 for the events, or combinations thereof, which may be stored in database 102. These initial rankings may be determined at 104 according to any suitable algorithm. For example, in one aspect, the system is optionally programmed to randomly select initial rankings for each of the participants of the selected multiple events for a given bet. In this example, the events are selected at 103, and then the initial rankings are determined afterward at 104.

In another aspect, the system may engage in determining the initial rankings as part of a separate process at 111. For example, the system may be configured to provide initial rankings for some or all of the event data stored in database 102, and these initial rankings may be applied at any time irrespective of whether players are making wagers, and/or irrespective of whether any bets are being created by the system. In another aspect, the system may apply a first initial ranking at 111, and then a second initial ranking at 104 that may use the first initial ranking to generate the second ranking, simply ignore the first ranking and overwrite it with a new second ranking unrelated to the first ranking, or any combination thereof.

At 105, the system may be configured to create pari-mutuel bets and allow players to place wagers on these bets using one or more processors of the system. In one aspect, the bet created at 105 may include the participants of at least two of the events that occurred in the past that were selected by the system for inclusion in the bet. In another aspect, the bets created by the system may include an execution time or "post time" indicating a time in the future when the outcome of the pari-mutuel wagers placed by the different players will be decided for a given bet. The execution time may be any time in the future, such as a time that is less than five minutes in the future, less than 30 minutes in the future, less than two days in the future, or two days or more in the future. In another aspect, the execution time(s) are optionally obtained from a remote server that is accessible via a computer network. In another aspect, the execution time may be calculated based on a predetermined schedule of bet event times. For example, the execution times may be calculated according to a predetermined interval between them e.g. every minute, every 2 minutes, every 10 minutes, and the like). In another aspect, creating a bet optionally includes determining initial rankings for the participants of the events that are included in the bet event data using the one or more processors.

The system may also be configured to update a bet schedule at 107. The bet schedule may be configured to maintain information about all active bets created thus far that are available to users, and/or all inactive bets that are either not available to users to bet on yet, or bets whose execution time has come and gone and are therefore no longer available for placing wagers. This data may be stored in a bet database 108. As with database 102, database 108 may be stored or hosted on any suitable computing device located close by, or that is remote available via a computer network.

The system may be configured to execute the actions 101-107 repeatedly selecting different types of events and grouping them together according to any suitable criteria. Thus the system may optionally simultaneously prepare new bets while existing bets are open for wagering. If the determination is made at 106 that no additional bets should be generated, the system may optionally continue to monitor the bet schedule. If more bets are needed, the system may return to 101 and assemble new bets for players to wager on.

Illustrated at 200 in FIG. 2 is one example of interactions between a user, and the system to facilitate live pari-mutuel wagers between multiple users betting on the same groups of historical events. A user may, for example, start at 201 by accessing the system, such as via a game terminal, personal computing device, or other suitable means. The "terminals" disclosed herein may take many various forms such as an application-specific computing device configured to display available bets, and to allow a user to provide input selecting a bet and providing currency transactional information for making a wager. In another aspect, a terminal may be a general-purpose personal computing device such as a smart phone, tablet, or desktop or laptop computer programmed and configured with software that provides access to the system to see available bets, accept wager transactional information and amounts, and the like.

The user may request to see available bet information, and the system may respond by providing the bet event data and the execution time(s) to the requestor at 202. Data about active bets may be accessed by the system at 203, and may be obtained from a bet database such as database 108. In one example, the bet event data 204 containing information about the multiple events for a given bet, and/or the execution times 218 for each bet, may be retrieved using the one or more processors of the system. In one example, the data 204 and execution time 218 may be requested by one or more remote terminals of the system, and the system may provide this information to the players using a display device that may be included in the remote terminals. The execution time(s) 218 for the active bets will be for some time in the future, thus giving users the opportunity to place wagers on the bets before the execution time arrives.

In another example, the user may request and retrieve past event data 204 about multiple historical events that occurred in the past, such as by using one or more processors of a terminal, as the term is generically used herein. In another aspect, the past event data optionally includes final rankings for the event participants. In another aspect, the final ranking of the event participants optionally indicates the outcome for each event participant with respect to other event participants who competed in the same event.

At 206, the system may provide the user the opportunity to select an active bet from the available bets presented by the system. In one example, a player may provide input via an input device of a terminal provided by the system, the input indicating which bet the player would like to place a wager on. Upon selecting a bet at 206, the system optionally determines initial rankings at 220 for the participants of the selected multiple events for the bet, or bets, the user selected. These initial rankings are optionally automatically generated by one or more processors of the system and may be submitted by the user as the predicted final ranking that will be compared to the actual final rankings for the event. In another aspect, determining the initial rankings at 220 may include randomly generating the initial rankings, or generating them by any suitable algorithm or process. In another aspect, initial rankings for the events in the bet the player selected may already have been created in the past as discussed above with respect to 104 and 111 in FIG. 1. Thus the determining the initial rankings at 220 may include obtaining them from the bet information selected at 206.

The system optionally updates bet information at 208 for the players. The bet information may be stored in a bet database such as bet database 108. In another aspect, bet database 108 may include information about users and the bets they have placed wagers on, the amounts wagered, the execution time, time remaining to execution, and the like.

In another aspect, the user may enter wager at 209, and the system may be configured to accept the wager at 210. Accepting the wager optionally includes accepting a wager amount defining an amount of a currency to wager using an input device, such as may be provided in a terminal of the present disclosure. Wagers may be accepted in any suitable manner, such as via a wager input device optionally configured to accept transactional information and/or an amount to be wagered. In one example, a terminal of the present disclosure may include a wager input device configured to accept transaction information and an amount to be wagered. Such transactional and amount input may be provided by any suitable means such as via cash inserted into a bill acceptor of a game terminal, or a payment terminal, or other similar device configured to perform a financial transaction for the purpose of encumbering funds for placing wagers; via a card swipe, or smart card reader electronically accessing a payment card account from which a wager amount may be withdrawn; via a credit voucher and scanner configured to read, validate, and accept the credit voucher as funds available for placing wagers; and/or via a Near Field Communication (NFC) or Radio Frequency Identifier (RFID) reader configured to access financial transactional capabilities provided by a smart phone, smart card, or other similar device configured to initiate a financial transaction for an amount to be wagered.

In another aspect, the system may be configured to update prize pools at 213 using one or more processors of a computer to initiate a transfer of at least a portion of the wager amount into a prize pool. Prize pools may be maintained in a prize pool database 214. The disclosed system may access the prize pools stored in database 214 throughout the wagering process in order to determine what players are to receive a prize, and the amount of the prize to pay out, if any.

In another aspect, the system may be configured to determine at least one predicted final ranking for participants of the events using the one or more processors. In another aspect, this determination is optionally made prior to the execution time for a given bet. This may occur at 211 when the user views the initial rankings for the participants of the historical events for the bet selected at 206.

In one aspect, the predicted final rankings may be determined according to input provided by the user using an input device. In another aspect, determining the predicted final rankings(s) may include using the one or more processors to automatically generate the predicted final ranking(s). In this example, the predicted final rankings may be automatically generated using one or more processors of the system. For example, the system may automatically generate the predicted final rankings by randomly generating the values.

In another aspect, prior to the execution time, the system may be operable to prepopulate the predicted final rankings for the event participants using initial rankings generated by one or more processors of the system. In another aspect, the system may display the predicted final rankings using a display device, such as a display device on a terminal of the present disclosure. In another aspect, the system may be configured to accept input from the input device changing the predicted final ranking for at least one of the event participants.

In one example, the multiple historical events are horse races, the participants are horses, the predicted final ranking is determined according to input obtained using an input device, such as an input device of a terminal, and the actual final ranking used to determine the result of the wager is based on the actual finishing positions of the horses. In another example, the multiple historical events are horse races, the participants are horses, the predicted final ranking is automatically generated using one or more processors of the system, and wherein the actual final ranking used to determine the result of the wager is based on the actual finishing positions of the horses.

In another example, determining predicted final rankings may include accepting input from one or more remote terminals defining at least one predicted final ranking for participants included in the bet event data for a given bet using one or more processors. In this example, the one or more remote terminals are optionally accessible via a computer network. In another aspect, the input obtained from the one or more remote terminals optionally includes input received from an input device of at least one of the terminals. In another aspect, the input selecting the predicted final rankings for the participants of the multiple separate events is optionally received from multiple separate computing devices operated by multiple separate users in different locations.

At 215, the user may have the option to accept the rankings, or at 212, to optionally provide input changing the rankings originally offered by the system. In another aspect, the system may be configured to obscure the initial rankings, or show the rankings but without the option for the user to change them. In another aspect, the type of bet may determine whether the player has the option to adjust the predicted rankings. For example, one type of bet may be configured to always select the rankings according to an algorithm provided by the system and also to eliminate all options for the user to make any changes to the rankings during the betting process. In another example, a different type of bet may allow the user to provide input captured by an input device of the system, such as an input device on a terminal. The input may adjust the predicted rankings, and the user may optionally provide this input at any time prior to the execution time of the bet. However the predicted rankings are determined, these rankings may be finally submitted along with the wager amount at 216 and the system may accept the player rankings at 217.

The process may continue as illustrated at 300 in FIG. 3 where the predicted rankings may be accepted at 217, the bet data in database 108 may be updated accordingly to reflect the wagers entered by the players. In another aspect, the system may be configured to watch for the execution times for the various bets at 302. If the execution time for a bet has not arrived yet, the system may be configured to continue to display the bet information along with optionally displaying a user interface that provides the option to change the predicted rankings, and/or change the wager amount (if such a change is allowed) according to the flow of interactions discussed above starting at 202 and following. The user may also be provided with the option to place additional wagers on the same or other bets starting at 202 as well. Thus prior to the execution time, input may be accepted, such as from one or more remote terminals, the input defining at least one predicted final ranking for participants included in the bet event data for a given bet. This may involve the use of one or more processors provided by the system (e.g. in system server), and the one or more remote terminals may be accessible via a computer network. In another aspect, the system may be configured to calculate a cut-off time for each bet after which no further input from the one or more terminals may be accepted until the execution time is reached.

When the execution time for a bet arrives at 302, or at any time thereafter, the system is optionally configured to determine the results (such as discussed briefly above at 110). The system may be programmed or otherwise operable to obtain or calculate a final outcome using the disclosed one or more processors provided by the system for this purpose. In one aspect, the final outcome may be based on a combination of differences between the predicted final ranking for participants of the multiple historical events and corresponding final rankings for the event participants. The system may programmatically match up the results of the actual historical event as it occurred in the past with the predicted final rankings provided with the player's wager in order to determine a final score at 303. A prize amount may also then be determined at 304 and the results displayed to the user at 305.

Using the predicted rankings submitted by the user, the system may calculate a final score and/or a final wager result at 303 and 304 using the one or more processors of the disclosed system. This final score may be calculated using the processors of a server, a terminal, a personal computing device, or of any other suitable computing device. Where terminals are involved, the final outcome may be calculated and provided to the one or more remote terminals for the benefit of the player any time on or after the execution time. In one example, obtaining the final outcome optionally includes sending the predicted final rankings to a remote server that is accessible via a computer network, and afterward receiving the final outcome from the remote server.

Any suitable scoring calculation may be used. In one example, the final score may be calculated based on the similarity (or the difference) between the predicted rankings and the final rankings of the participants in their respective events. The score may in this example be higher where the predicted rankings more closely match the final rankings for the participants in the event, and proportionally lower as the predicted rankings differ more widely from the final rankings.

For example, determining the final score at 303 may include generating a wager result by comparing the predicted ranking to the final ranking for each participant of each event using the processor. A prize amount may be calculated using the processor at 304 based on the final score and the wager entered by the user. In another aspect, a prize amount may be higher for a wager result that is less likely to occur, and lower for a wager result that is more likely to occur. In another aspect, the final prize amount is optionally a currency and the prize is based on the final outcome.

The system may also be configured with a lowest paying result that operates as a predetermined threshold. Wager results that are below this predetermined threshold may then receive a zero prize amount meaning that the user loses some or all of the wager amount initially entered at 209.

In another aspect, obtaining the final prize amount optionally includes requesting the final prize amount from a remote server that is accessible via a computer network. In another aspect, the final prize amount may be calculated by the remote server according to a probability of occurrence assigned to the final outcome, and a probability of occurrence that is greater than or equal to a predetermined threshold optionally results in a non-zero prize amount. In yet another aspect, a probability of occurrence that is less than a predetermined threshold optionally results in a zero prize amount.

In another aspect, the system may be configured to use the one or more processors to initiate a transfer of the prize amount as a currency amount out of the common prize pool(s) in prize pool database 214 and into the users' account in the case where the prize amount is greater than zero. This may occur automatically, or based on a prompt provided by the user using an input device such as a keyboard or touchscreen.

In another example, the processor may initiate a transfer of the prize amount when a user provides input requesting the system to cash out at 307 any prize money the user may have accumulated thus ending the overall wagering process at 310. If the user does not elect to cash out, the system may present an option to continue with another wager at 206. The user and the system may then interact as disclosed to repeat the betting process any number of times where the user has sufficient funds to wager repeatedly. Multiple users may engage in the actions discussed herein entering money into the common prize pools and withdrawing winnings where they are obtained. In this way, the system is configured to allow users to participate in pari-mutuel betting on multiple past events having multiple participants.

Seeing the results, of user may request to see additional details about the historical events the bet was based on. In one aspect, viewing additional details at 306 may include requesting the system to provide those details at 308. The additional details about the historical events may include using the processors of the system to render a graphical representation of at least a portion of the data about at least one of the multiple historical events using the one or more processors, and/or displaying the graphical representation using a display device (such as a screen mounted to the terminal the user is interacting with). In one aspect, rendering the graphical representation of at least a portion of the data may include rendering an animated replay of at least a portion of one of the multiple historical events using the one or more processors, and optionally using the one or more processors to control the display device to display the animated replay.

In another aspect, the additional details about the historical event(s) may include using the processor to control a display device to display a video representation of at least a portion of one of the multiple historical events on the display device. In either case, the animated replay, and/or video representation may be generated or otherwise obtained by the system and stored for later presentation to the user upon request. For example, live video clips, or previously generated animations, or any combination thereof, may be stored in a database such as the event database 102. In another aspect, the rendered graphical representation and the video representation may be thought of as one and the same presentation whereas a video representation may be thought of as a rendered graphical presentation, and vice versa. In another aspect, the rendered graphical representation may be a "cartoon" presentation with icons and graphics showing the results without providing specific recognizable details about each separate participant. In another aspect, the video representation may include some or all of a video recording made of the actual event as it occurred in the past.

In another aspect, FIGS. 1-3 illustrate three separate databases 102, 108, and 214. However, these representations are illustrative only, as the system optionally stores all necessary data in a single database containing all the event data, bet data, and prize pool data in the same database.

Figure 4:
FIGS. 4-8 illustrate various user interface aspects for presenting output and accepting input according to a method of the present disclosure.
Figure 5:
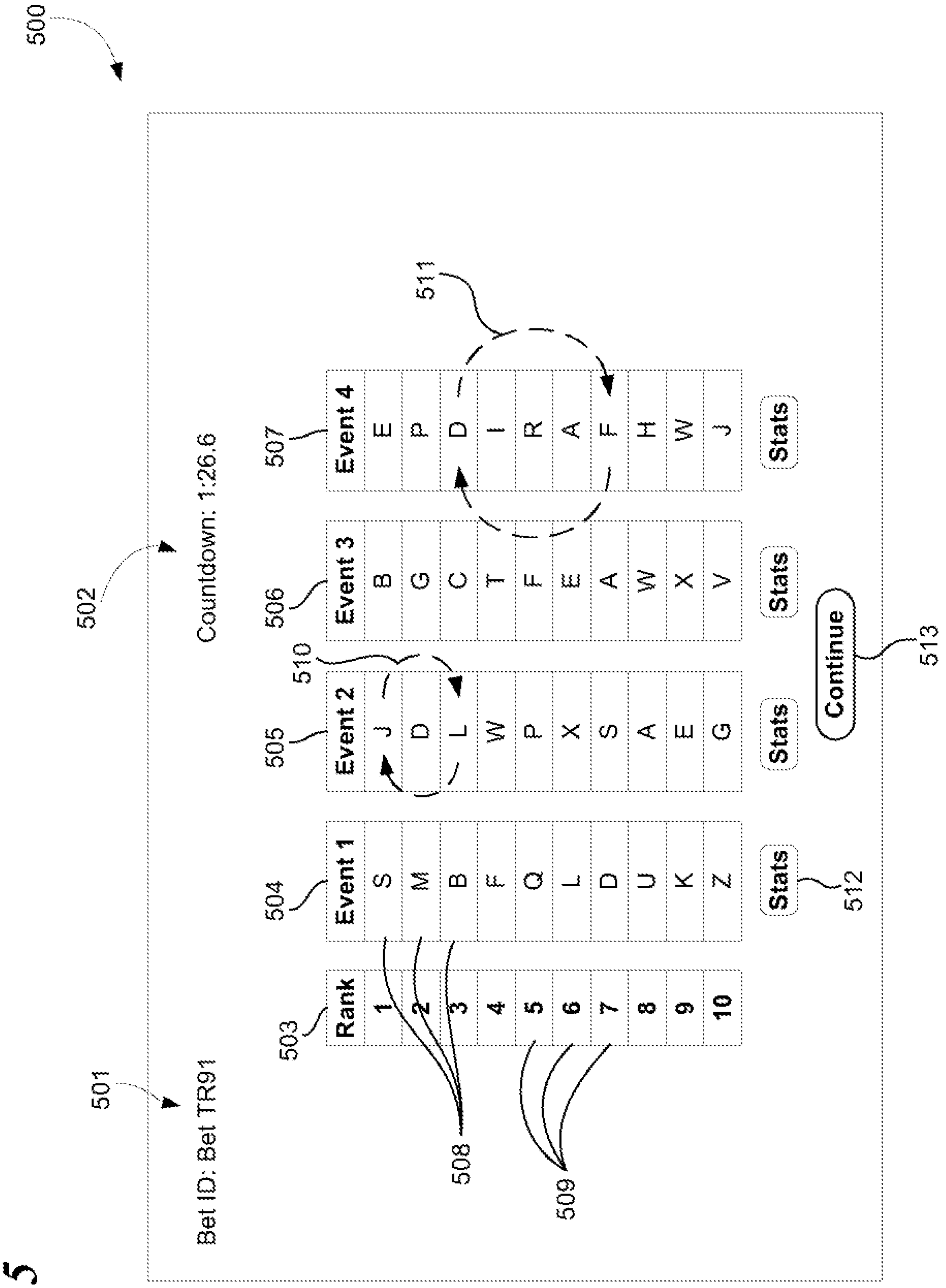

FIGS. 4-8 illustrate various user interface aspects that may be included in the system to present output and except input according to the disclosed method. Illustrated at 400 in FIG. 4 is one example of a bet schedule of the present disclosure. The bet schedule 401 may include listings of bets at 402, player counts at 403 indicating the number of players who have placed wagers on a given bet, start times at 404 indicating when the wagers will be resolved, and countdown timers at 405 providing feedback to the user regarding how much time is left until the wagers for a given bet will be resolved. In this example, each row of the display is a separate bet such as a bet 406 with the identifier 3X8Q, and a bet 407 with the identifier TR91. In this example, the bet schedule 401 is provided in a tabular format, but any suitable format may be useful and may be presented by the system. In this example, the system may be configured to select input from the player selecting a bet the player would like to wager on. Such input may be provided by any suitable means. In one example, the individual bets at 402 include individual separate user interface controls such as buttons, or hyperlinks, or other similar selection controls specific to each bet listed. These specific controls allow the user to provide input selecting a bet.

When a bet is selected, the system may optionally present a screen allowing the user to view the predicted rankings for the participants of the multiple events associated with the given bet selected. One example of such a user interface is illustrated at 500 in FIG. 5. In this example, the bet selected may be illustrated at 501, along with an optional countdown timer at 502 giving the player feedback as to when the option to modify the wager will pass. In one aspect, if a player has not elected to continue, such as by providing input at 513, prior to the termination of the countdown clock at 502, no wager will be entered, and the user may be shown the bet schedule 401 and given the opportunity to enter a wager on a different bet that is still open.

In another aspect, the predicted rankings are shown for each separate event such as in a tabular form with rankings 503 represented by each row (such as rankings 509), and separate events 504-507 presented as columns. Individual participants may be identified by any suitable indicia 508 such as a single letter, number, icon, or other identifying representation for each participant of each event.

The system optionally provides access to statistical information 512 with details about each event. In one aspect, statistical information 512 optionally may only be provided where players have the option to adjust the initial rankings provided by the system. For example, the event rankings may be adjusted such as at 510 and 511 where the player has made an adjustment to the initial rankings by selecting one participant and indicating that the selected participant should be moved to a different position in the finishing order for a given event. For example, at 511, participant F is swapped with participant D to indicate that the player is predicting that participant D will finish third and participant F will finish seventh. At 510, participant L and participant J are swapped to indicate that the player predicts that participant J will finish first, and participant L will finish third. Where the system provides this option, the user may continue to adjust the predicted finishing order for the participants of the events until either the countdown reaches zero at 502, or the user elects to confirm their choices at 513 and submit the wager.

Figure 6:
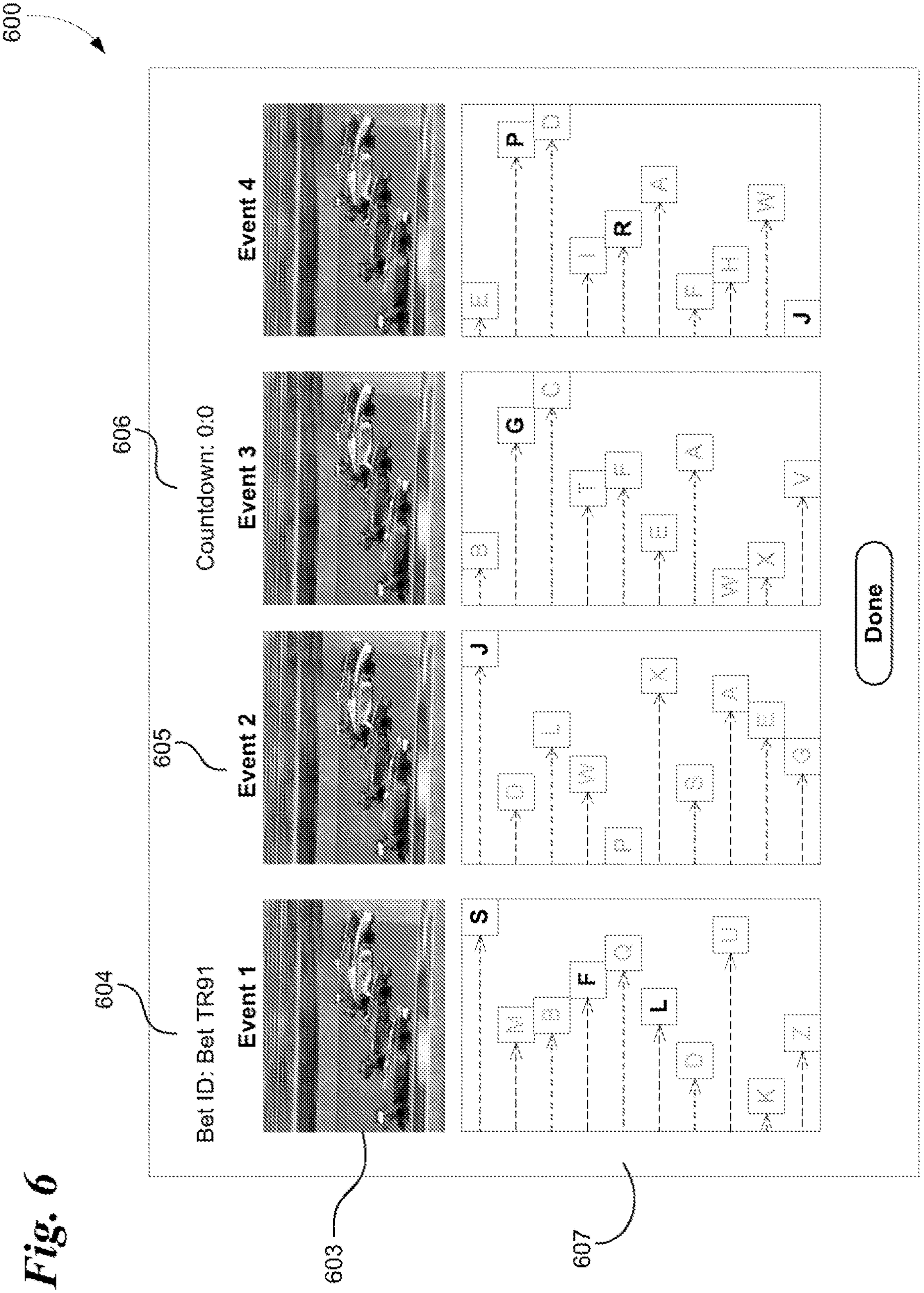

In another aspect, when the countdown reaches zero for a given bet, the system may provide a graphical representation of the results, one example of which is illustrated at 600 in FIG. 6. In one aspect, the bet may be identified in 604, and the results for the multiple events associated with a given bet may automatically be displayed when the countdown clock at 606 reaches zero. In this example, differences between the predicted final rankings, and the actual final rankings are optionally represented at 607. For example, for Event 1, the wager was placed based on a predicted outcome of participant "S" finishing first, participant "M" second, participant "B" third, participant "F" fourth, and so on. As illustrated at 607, the player correctly predicted the finishing order for three of the 10 participants in event one, one of 10 participants in Event 2, one of 10 participants in Event 3, and three of 10 participants in Event 4. In the aggregate, the player accurately predicted the finishing results for eight of 40 participants.

The user interface at 600 optionally provides different types of feedback to the player that may be useful for indicating the results. For example, in one aspect, the system may provide an animation, video replay, movie clip, or other visual cues taken from the actual event at 603. In another aspect, the system may optionally provide indicia indicating the results at 607. For example, the participants of the events may be indicated by their identifiers and may begin at one side of the display at 607, such as at the left side, and may move across the display to the right side stopping at their relative actual finishing order with respect to other participants in the same event. In this example, the position of each participant's identifier left to right may provide visual cues as to the results of the actual event. In another aspect, other indicators may be provided such as changing the color, changing the font, and the like for each participant identifier where the predicted and final rankings match.

Any suitable display of the results may be included. In one example, displaying the results includes rendering a graphical representation of at least a portion of the bet event data using the one or more processors provided by the system, and optionally providing the graphical representation to one or more remote terminals. The remote terminals may be configured to then display the graphical representation in a display similar to the one shown in FIG. 6. In another aspect, displaying the results may include providing a video representation of at least a portion of the bet event data to the one or more remote terminals. In another aspect, displaying the results may include using a processor to control a display device to display a video representation of at least a portion of one of the multiple historical events on the display device.

Figure 7:
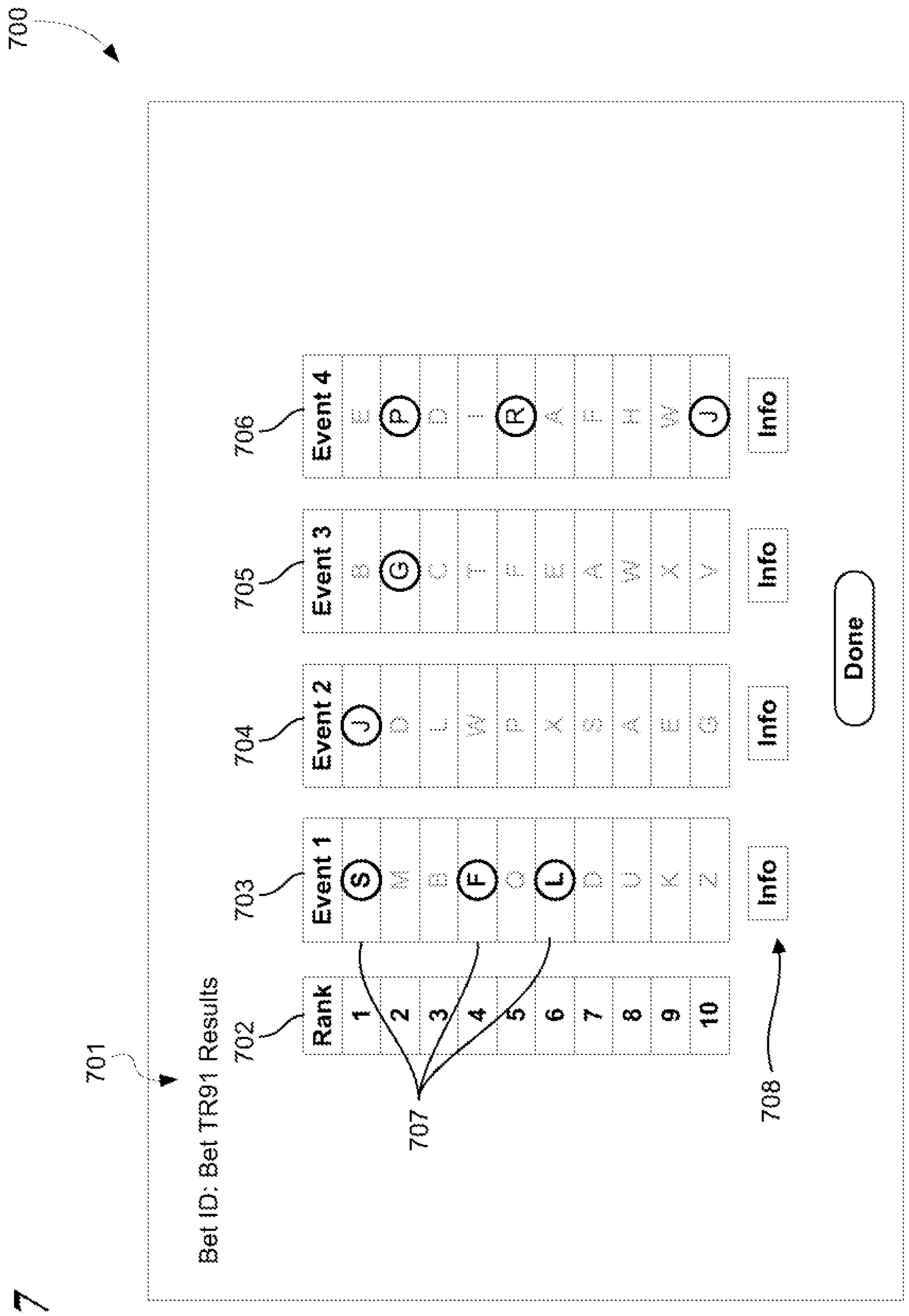
Figure 8:
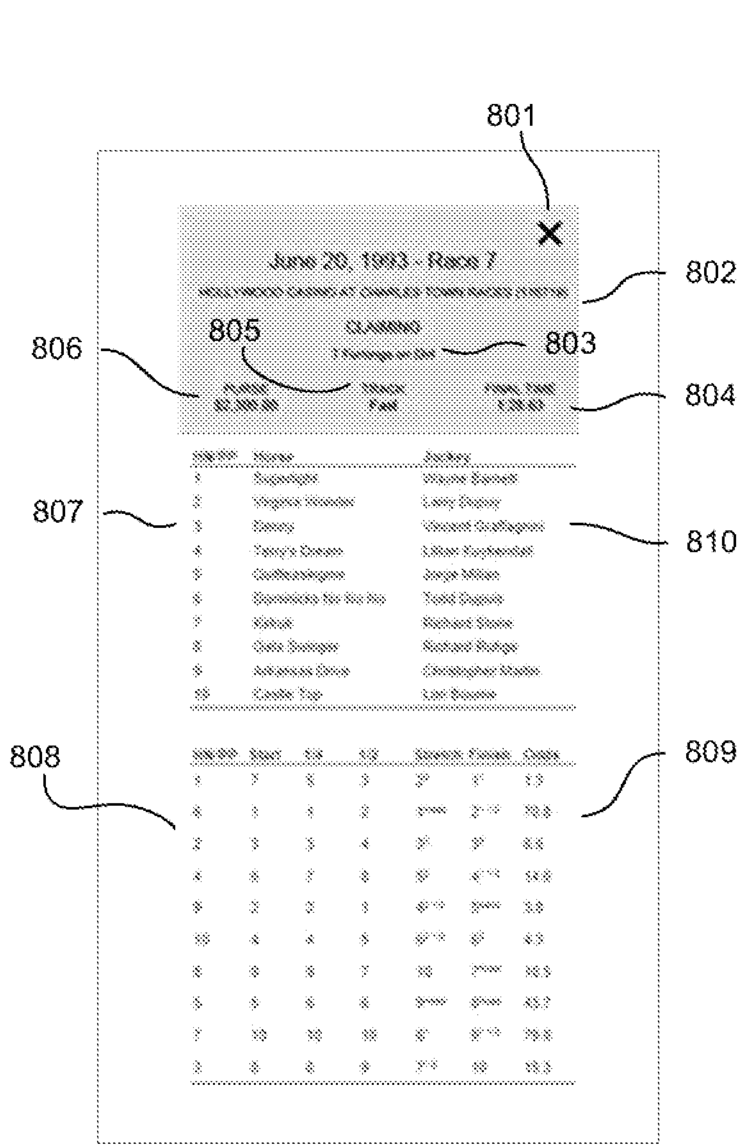

In another example illustrated at 700 in FIG. 7, the results of the predicted versus the final outcome are illustrated in a tabular form. Rankings are illustrated as rows at 702, and the participants of the individual historical events as columns 703-706. Indicia 707 may be provided indicating to the user where their predicted rankings matched their actual rankings.

Additional details may also be viewed by selecting the info at 708 for the particular event of interest. Selecting this option can open a display like the one shown in FIG. 8 at 800 that is optionally configured to show additional details about the corresponding event. One example of the kind of additional details that may be available is shown with respect to a horse race, and thus it may vary depending on the type of historical event included in the bet. In this example, the information may include the date and time of the race, as well as the location shown at 802, the type of race and race distance at 803, the winning time at 804, the track condition at race time at 805, and the purse at 806. At 807, the name of each horse may be shown, and its assigned numerical identifier (e.g. 1-10) which may correspond to the starting gate position. The jockey assigned to ride each horse may also be listed at 810. Timing information may be provided at 808 where the arrangement of the horses in the starting gate is shown along with the position of each horse at various points around the track, and at the finish. Winning odds for each horse may also be listed at 809. Other information may be displayed as well. For other sports, where the participants are not horses, the information given at 800 will likely be different, but tailored to the type of event. When the user has finished studying the chart at 800, the chart can be closed by selecting or clicking the "close" icon 801.

Figure 9:
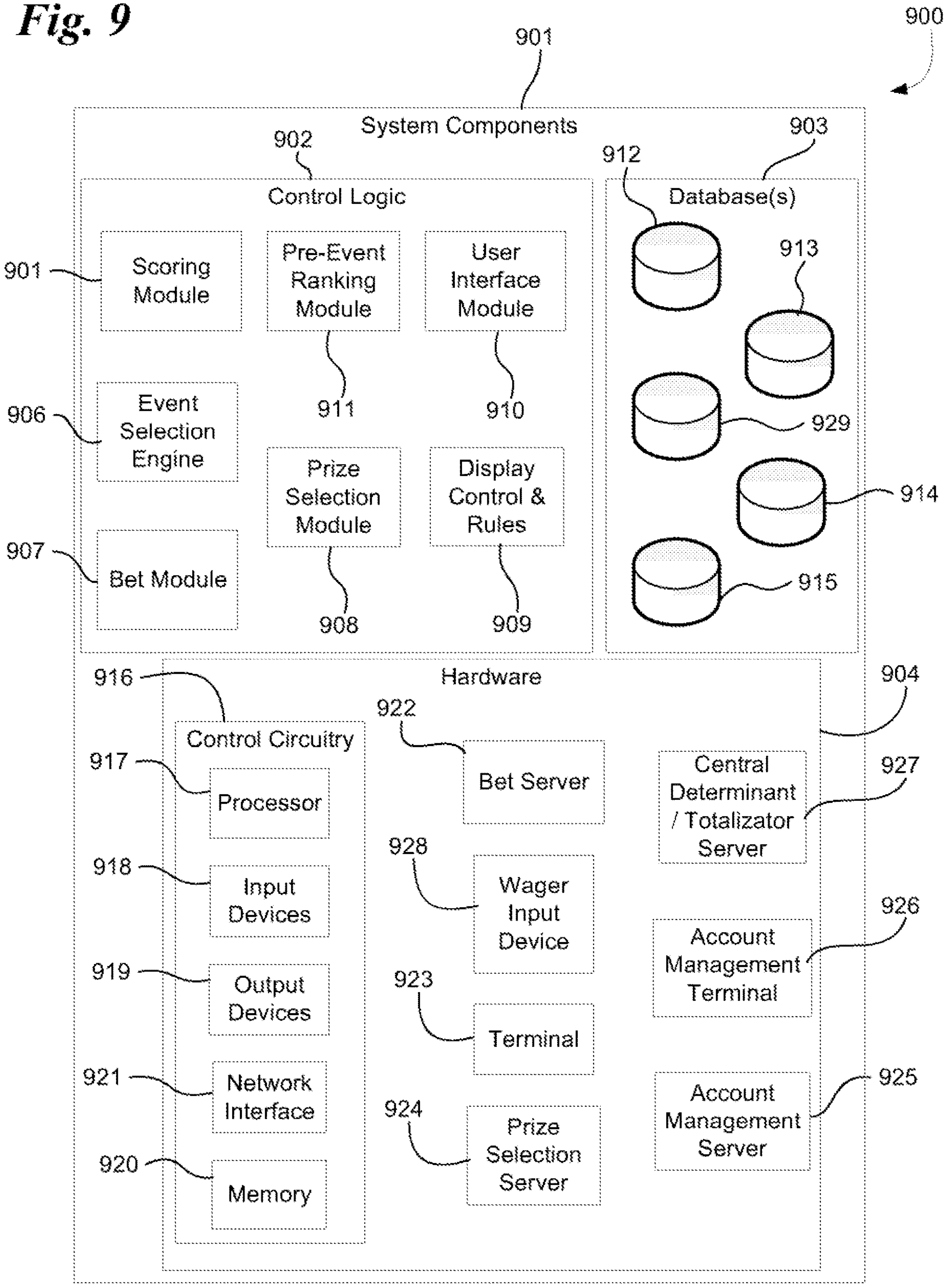
FIG. 9 is a component diagram illustrating one example of components of the system for live pari-mutuel wagering of the present disclosure.

FIG. 9 illustrates at 900 one example of components that may be included in a system for live pari-mutuel wagering on multiple events of the present disclosure. The system may include system components 901, which may further include, control logic 902, databases 903, and hardware components 904. In another aspect, hardware components 904 may include any suitable control circuitry such as control circuitry 916. Examples of such components include a processor 917, a memory 920, a network interface 921, input devices 918, output devices 919, and any suitable combination thereof. In some cases, other control circuitry may be included as well, and/or some of the types of devices shown at 900 may be absent.

Control logic 902 may include software or hardware implemented control logic programmed or configured to implement the disclosed functionality. Control logic 902 may include a scoring module 905 configured to calculate a final score, such as by comparing the difference between the predicted rankings for the participants of the multiple events and the final rankings of the participants ranked according to the actual results of the events that occurred in the past.

A pre-event ranking module 911 may be included and configured to determine an initial ranking for each participant. This initial determination may be made randomly, may be based on other data associated with each historical event, or according to any suitable criteria. In another aspect, control logic 902 may include a user interface module 910. User interface module 910 may be configured to control a display device or other suitable output device 919 to display output for a user which may include, but not be limited to, a bet schedule, initial predicted final rankings for the participants of the historical events, the results of the wagers placed for a given bet, and/or additional information about the historical events. The user interface module may also be configured to accept user input defining user selected rankings where that option is available, such as where the user takes advantage of the option (where available) to change the initial rankings for at least one participant for at least one of the selected events using an input device 918.

In another aspect, control logic 902 may include an event selection engine 906 configured to retrieve event data about multiple historical events that occurred in the past from a database accessible by the disclosed system. This event data may include data about multiple participants participating in the selected events retrieved from a database of historical event information such as 929.

Control logic 902 may also include a scoring module 905 configured to calculate a final score as disclosed herein. The final score may, for example, be calculated according to a combination of differences between predicted rankings for the participants that were submitted by the user with their wager, and one or more final rankings of the participants in the actual events occurred in the past.

A prize selection module 908 may also be included and optionally configured to calculate a prize amount using one or more processors of hardware components 904. For example, the prize amount may be a currency amount based on the final score and the amount wagered by the user. In another aspect, the price selection module 908 may determine the prize amount according to a number of correct predictions provided by the user in a given wager. A. "hit" may indicate a correct prediction for a given participant of a particular event, and a miss may indicate an incorrect prediction for a given participant of an event. The prize selection module 908 may optionally generate a wager result that includes the collection of hits and misses. This wager result may be used by selection module 908 to determine a payout level for a given wager.

In another aspect, control logic 902 optionally includes a display and control module 909 configured to implement a flow of interactions between the player and the system as disclosed in the preceding figures. Module 909 may, for example, be included in a terminal, and a remote server, or any combination thereof, and may collaborate to offer appropriate options for accepting input from the user, validating user input, and activating other software modules as needed to process wagers on the bets made available by the system.

The system may optionally include a bet module 907 which may be configured to use appropriate hardware 904 to initiate a transfer of an amount to be wagered into a common prize pool, and to initiate a transfer of a prize amount out of a common prize pool according to payout rules implemented in module 907. For example, module 907 may require that a prize amount be greater than a predetermined threshold value. Prize amounts less than the special value optionally result in a zero payout to the player.

Databases 903 may include any suitable databases the system may find useful for providing the disclosed functionality. Databases may include a database 912 for maintaining bet data about current active bets with execution times that have not arrived yet, or closed bets whose execution times have passed, or any combination thereof. In another aspect, databases 903 historical event database 929 configured to operate as a store of data for information about the historical events, and the participants that competed in those events. Database 929 may also include race replay information such as video clips, rendered graphical representations of the events, or portions thereof, or any suitable combination thereof. Database 929 may also include charts, graphs, statistical data, and the like explaining predicted results that may have been calculated in advance of the event before it occurred, and actual final results for various participants participating in past events.

In another aspect, databases 903 may include prize configuration database 914. Database 914 may contain information about prize payouts such as amounts to be paid out when a player matches particular threshold numbers of predicted results to actual results for a given bet. The database 914 may maintain predetermined relationships between wager results and payout levels. For example, the database may include entries for all possible combinations of hits and misses that may be determined by price selection module 908 for a given set of multiple events. In this way, price selection module 908 may be configured to quickly determine a prize for a given collection of hits and misses or each wager.

In another aspect, database 914 may include a probability associated with each separate combination of hits and misses which may be used by the system to determine an overall payout. For example, where a low probability combination of hits and misses occurs in the outcome of a wager, a higher payout may be awarded. Conversely, where a high probability combination of hits and misses occurs in the outcome of the wager, the system may be configured to award a lower payout. An example of a high probability combination of hits and misses may be where the user correctly guesses half of the results. Example of a low probability combination of hits and misses may be where the user correctly guesses all of the results.

Databases 903 may include other databases according to the present disclosure such as account information database 913 which may be used to store contact information, dollar amounts associated with a particular user related to wager wins or losses, and any payouts that are available to the player, or payments that are required in order to maintain the account in good standing and continue making wagers. Databases 903 may also include a database 915 for maintaining one or more prize pools associated with the different betting opportunities provided by the system. Wager amounts collected from players may be pooled and payouts taken from the pool 915 according to the overall results of all players.

Databases 903 are described herein separately as being different databases maintaining different types of data. However, some databases 903 may be configured to store the separate data in a single "database" as defined herein with a single organized collection of information maintaining the data discussed. Databases 912, 913, 914, 915, and 929 may be configured as individual collections of data maintained by separate Database Management Systems (DBMS), or as a single collection of data separated logically and maintained by a single DBMS. Whether separate databases, or a single database with various types of data stored therein, databases 903 that may be used by the system may be maintained within a single physical computing device or within multiple physical computing devices communicating via communication links which may include computer network. Similarly, databases 903 may also be physically stored on a single storage media such as a Hard Disc Drive (HDD) mounted in terminal, or on any combination of separate individual storage media in one or more computing devices shared or accessible by multiple servers or terminals.

In another aspect, hardware 904 may include any suitable arrangement of collaborating servers, terminals, and the like. For example the system may include bet server 922 which may be configured to facilitate some or all of the disclosed functionality including, but not limited to accessing bet data from a database for the purpose of providing the bet data to a terminal or other computing device, updating bet information when the user selects a bet to participate in, excepting player rankings and/or determining an initial set of predicted final rankings that may either be accepted by the user without change, or modified by the user before submission. The bet server 922 optionally may also configure and create bets by accessing historical data from a database of historical events, selecting multiple events, determining initial rankings, creating the bets, and updating a bet schedule with new bet information. Bet server 922 may be implemented as one computing device, multiple computing devices, or may be integrated within other hardware 904 such as a terminal 923, and/or a central determinant/totalizator server 927.

In another aspect, hardware 904 may include a terminal 923. A terminal of the present disclosure may be arranged and configured with any or all control circuitry 916 and may be thus configured to display bet information, accept input from user according to any of the user input discussed in the present disclosure. For example, terminal may be configured to allow a user to select the bet, enter a wager, view rankings, and or change or accept the rankings, and submit the rankings prior to the execution time for a given bet. A terminal 923 may also provide the opportunity to view the outcome of the bet, and details about the historical events associated with the bet such as replays, animations, video clips, and the like.

In another aspect, terminal 923 may include implementation of other disclosed functionality such as accessing historical data, selecting multiple events, determining initial rankings, creating bets, and updating a bet schedule. In this example, terminal 923 may be configured to operate independent of remote servers and may thus maintain bet information, event data, payout information, or other data in databases 903 within a given terminal, or group of terminals collaborating together. In another aspect, terminal 923 may provide other functionality such as the ability to access bet data, update bet information provided by the user, update prize pools, and/or determine prizes or payouts, or any combination thereof. In another aspect, the input device 918, and optionally the output device 919, may include a touch screen mounted in a terminal 923 that may be coupled to one or more processors. At least one of the one or more processors may be mounted in the terminal. In another aspect, a terminal 923 may be implemented as a personal computing device, or may optionally be implemented to include a personal computing device.

In another aspect, hardware 904 of the disclosed system may include an account management terminal 926 which may be configured to accept transactional information for facilitating the disclosed wagering process. For example, transactional information may include dates, times, amounts, and/or payment information such as credit card information, cash amounts, credit vouchers, and the like. In another aspect, account management terminal may include payment system readers capable of interacting with payment devices such as smart phone, tablet, or payment cards via wireless communication links such as may be provided according to Near Field Communication (NFC) or Radio Frequency Identification communication protocols (RFID). An account management terminal of the present disclosure may accept personal information about players such as name, address, other contact information that may be maintained for later reference. In another aspect, aspects of accepting payment information, and personal information about a player may be incorporated into other hardware 904 such as into a terminal 923.

Hardware 904 may also include an account management server 925 which may communicate with account management terminal 926. In one aspect, the server 925 may provide services to a terminal 926 and may store account information in the account info database 913. In this configuration, the account management server may accept account information, transactional or payment information, and the like, from an account management terminal and may store and maintain the information in a database 913. In another aspect, features and functionality provided by account management server 925 may be incorporated into other hardware 904 for the present system such as into management terminal 926, terminal 923, a central determinant/totalizator server 927, or other suitable hardware.

In another aspect, hardware 904 may include a wager input device 928 which may be arranged and configured to accept a wager in any suitable form. For example, a wager input device may include the ability to physically accept and/or read credit cards, cash, credit vouchers, and the like. In another aspect, wager input device 928 may include other readers or decoders capable of interacting with payment services provided by computing device such as smart phones, tablets, or computing devices embedded in payment cards. These electronic payment services may be accessed via wireless communication links such as may be provided and accessed using any suitable wired or wireless communication link such as may be provided by Near Field Communication (NFC) or Radio Frequency Identification communication protocols (RFID), or by other means such as by scanning a barcode, QR code and the like, or as may be provided by input from the user. Such user input may include, but not be limited to, account numbers, routing numbers, expiration dates, Personal Identification Numbers (PIN) or other such input as may be required by a wager input device 928.

Figure 10:
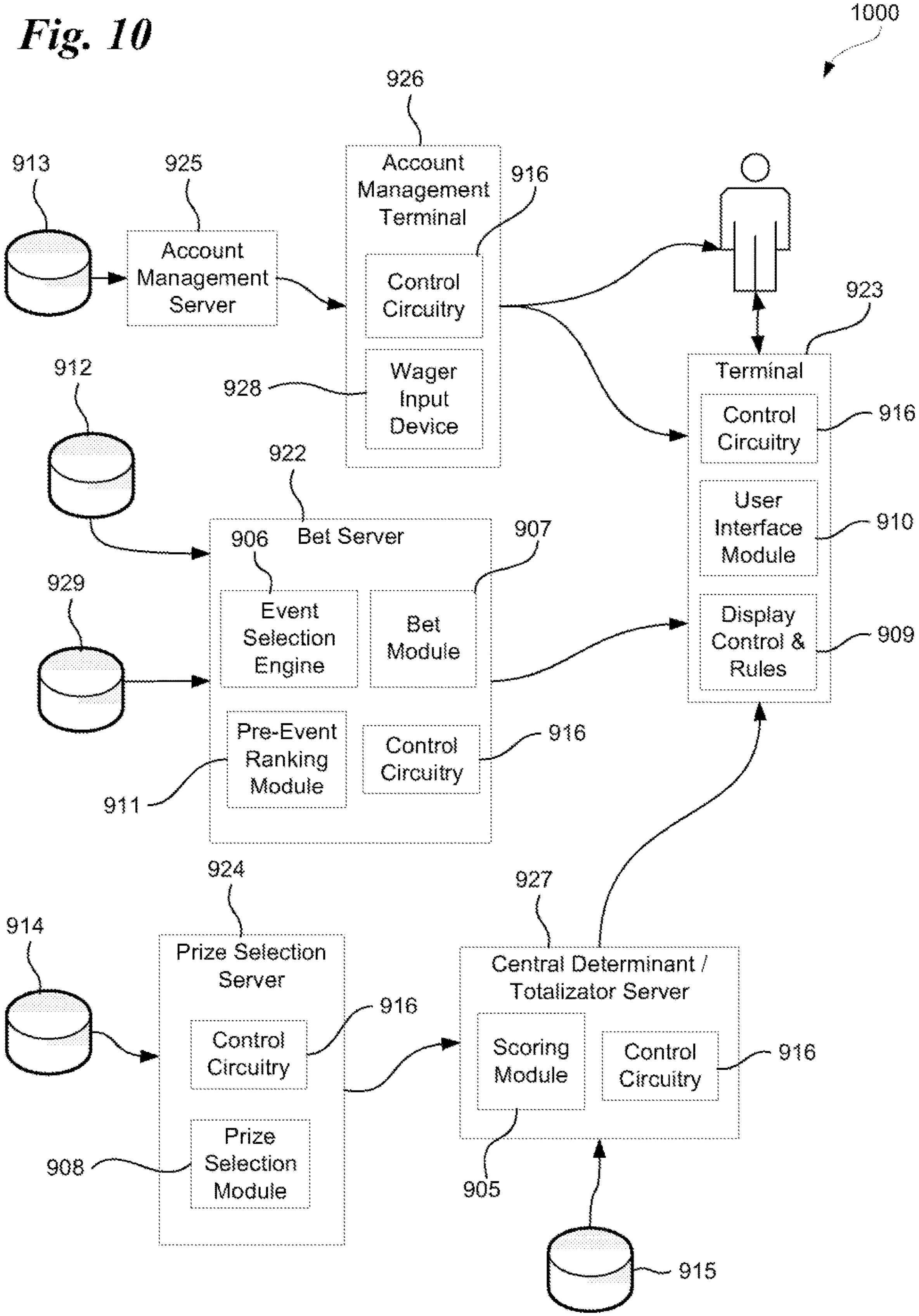
FIGS. 10-13 are component diagrams illustrating examples of system architectures that may be employed in the system for live pari-mutuel wagering of the present disclosure.

FIGS. 10-13 illustrate some examples how the disclosed system may be configured to provide the functionality described herein. Any suitable system architecture may be employed in the system for live pari-mutuel wagering of the present disclosure. For example, the example shown at 1000 in FIG. 10 is one where multiple remote servers collaborate with a terminal, and an account terminal, to provide the disclosed system.

In one aspect, the user may interact directly with an account management terminal 926 that optionally includes control circuitry 916, and/or a wager input device 928. In this example, account management terminal 926 may communicate with an account management server 925 via a suitable communication link. Account management server 925 may provide account related services and information support of the terminal 926. In another aspect, account management server 925 may be in communication with account info database 913 via a communication link.

In another aspect, the user may interact with a terminal 923 that may optionally include control circuitry 916, user interface module 910, and display control rules 909. Terminal 923 may also communicate with the account management terminal 926 to receive account related information that may be useful for facilitating user interaction with the overall system. In this configuration, terminal 923 may be separate and distinct from account management terminal 926, bet server 922, prize selection server 924, and central determinant totalizator server 927. For example, terminal 923 may be included in a separate cabinet, or housing, separate from the other server and database components thus allowing the server and database components to be physically remote from the terminal 923.

In another aspect, the system architecture at 1000 includes a prize selection server 924 which may be configured to include control circuitry 916, and prize selection module 908. The prize selection server 924 may be in communication with prize configuration database 914, such as via a communication link.

In another aspect, the system shown at 1000 includes a bet server 922 that interacts with terminal 923 to provide betting services. Bet server 922 may include the event selection engine 906, the bet module 907, and/or the pre-event ranking module 911, and may operate using control circuitry 916. Bet server 922 may communicate with bet database 912 and historical events database 929 to manage the bets that are offered for users to wager on, and to obtain data about historical events to include with the bets. Bet server 922 may communicate with bet database 912, historical events database 929, and terminal 923 using one or more communication links.

The central determinant translator/totalizator server 927 may include a scoring module 905 control circuitry 916. The server 927 may also be in communication with payout pools 915, and the prize selection server 924. This communication may be facilitated by one or more communication links allowing the central determinant/totalizator server 927 to collaborate with the prize selection server to offer different configurations of prizes. In another aspect, central determinant/totalizator server 927 may interact with payout pools database 915 to determine payouts for winning bets.

In one aspect, account management terminal 926, terminal 923, bet server 922, prize selection server 924, and central determinant/totalizator server 927 are optionally housed in separate physical enclosures, located physically distant from one another. In this configuration, the various services provided by the system are distributed geographically and are operated using separate independent control circuitry 916. Each of the servers and or the terminal 923 may be implemented to communicate via a computer network or by any other suitable communication links, whether wired or wireless, the disclosed servers and terminals may be present at the same physical location, or distributed around the world. This way, players may participate using a terminal 923 at a location irrespective of where the remaining servers are located so long as terminal 923 has access to the account management, prize selection, and other disclosed functionality.

Figure 11:
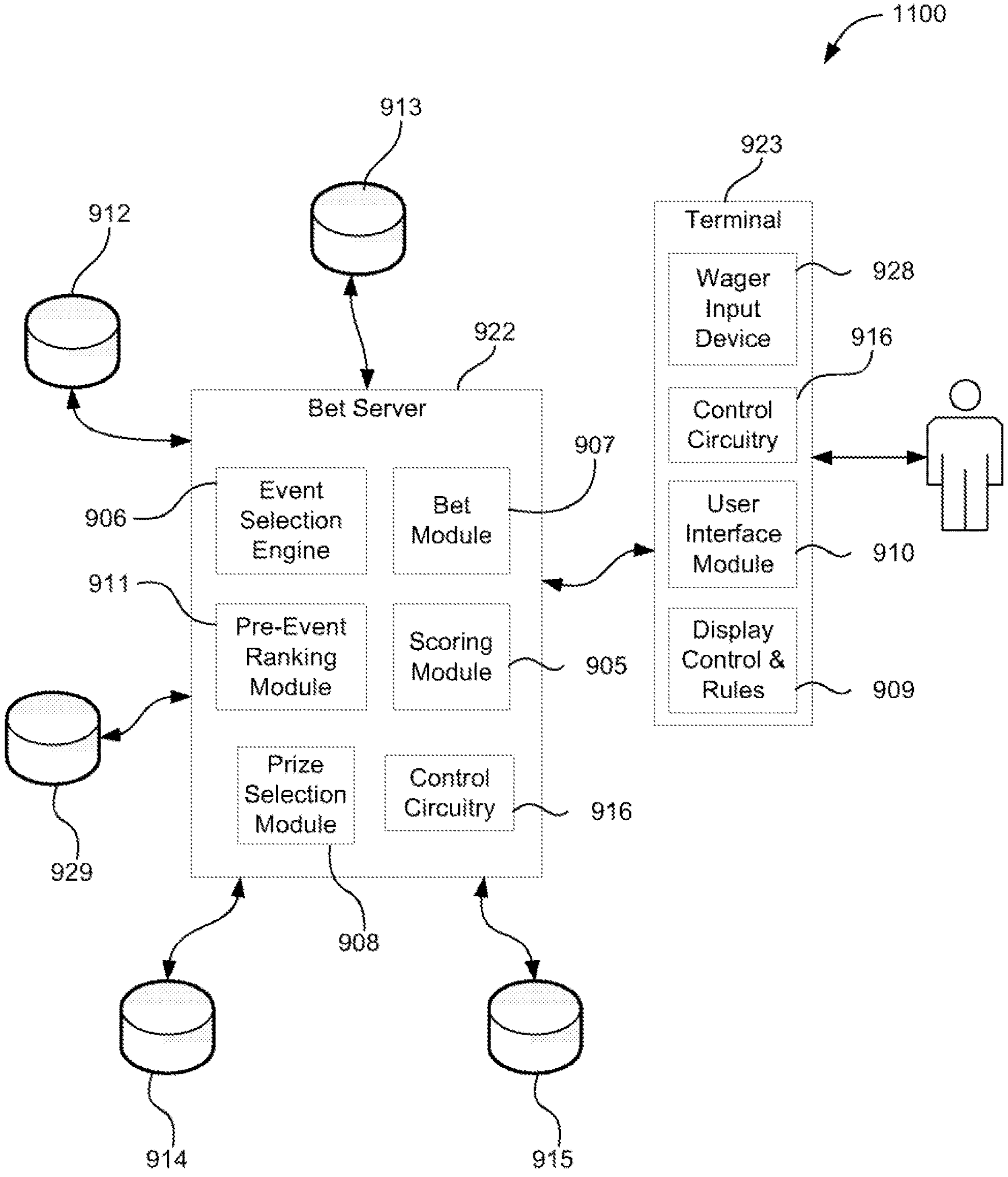

FIG. 11 illustrates at 1100 another example of a system architecture that may be configured to provide live pari-mutuel betting on historical events according to the present disclosure. In this example, the terminal 923 may be any suitable computing device that includes the wager input device 928, control circuitry 916, the user interface module 910, and display control rules 909. In this configuration, a user may make wagers by providing payment directly at the terminal 923.

The terminal 923 may then communicate with a bet server 922 which may be any suitable computing device and may optionally be remote from the terminal 923 and/or in communication with the terminal 923 via one or more communication links. The bet server 922 may include the event selection engine J 06, the bet module 907, the scoring module 905, the pre-event ranking module 911, and/or the prize selection module 908, all of which may be executed or otherwise made operable by control circuitry 916. In this example, software modules that were spread across multiple servers and multiple physical locations and/or across multiple different computing devices illustrated in FIG. 10 are localized in the bet server 922.

In another aspect, the bet server 922 may be in communication with account info database 913, the bet database 912, the historical events database 929, the prize configuration database 914, and the payout pools 915, In another aspect, communication between the bet server 922 and the databases illustrated in 1100 may be provided via one or more communication links of any suitable type. In another aspect, the databases in 1100 may be hosted on database management systems that are physically separate from the bet server 922. In another aspect, the databases in 1100 may be included in database management systems that are physically integrated with bet server 922. Bet server 922 may therefore operate as a single point of contact for the terminal 923 and may thus handle all of the event selection, ranking, scoring, prize selection, and other functions the terminal 923 may require.

Figure 12:
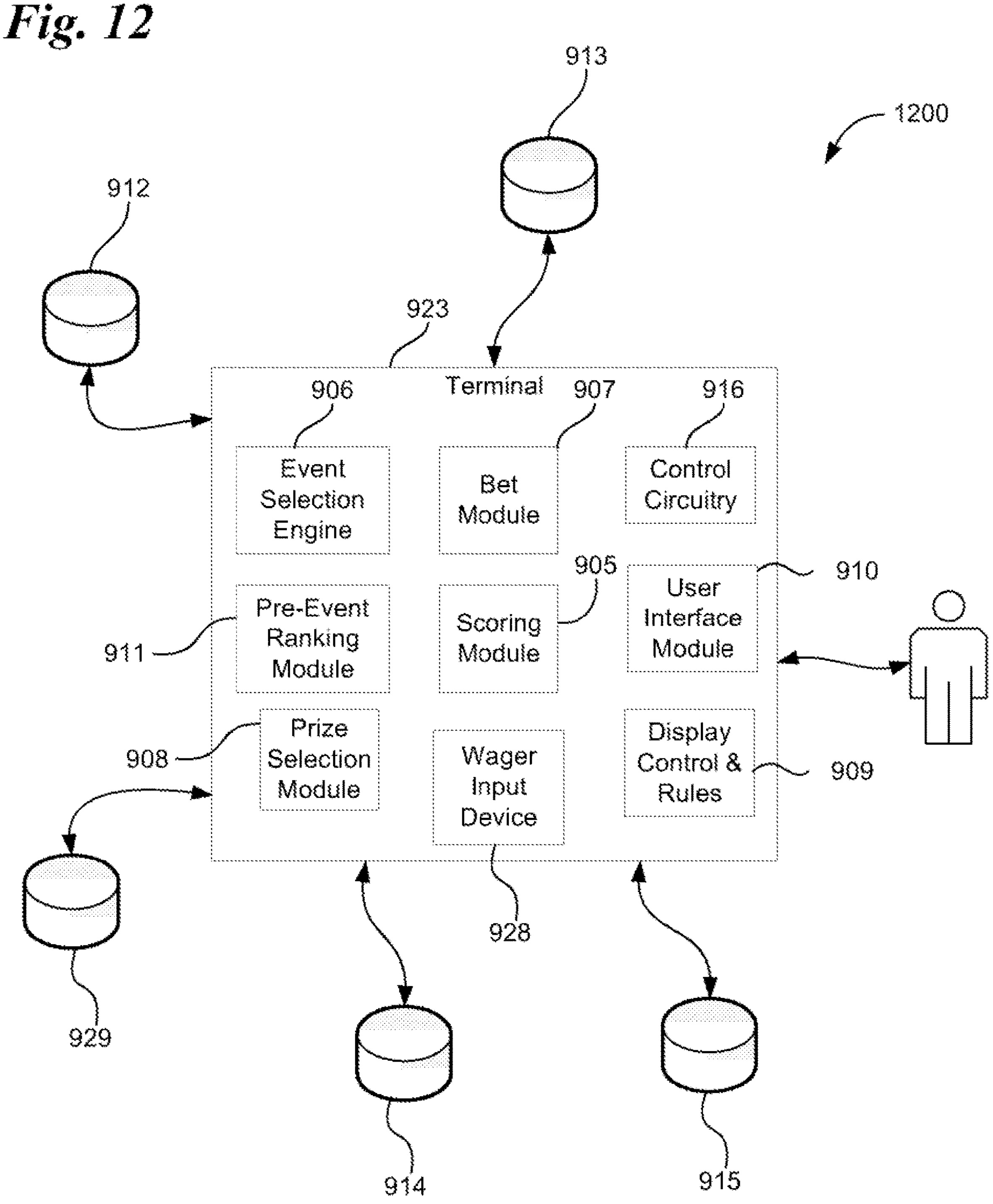

Illustrated at 1200 in FIG. 12 is another example of a configuration of the disclosed software and hardware. In this example, the terminal 923 includes the event selection engine 906, the bet module 907, event ranking module 911, the scoring module 905, the user interface module 910, the prize selection module 908, a wager input device 928, and display control rules 909. The terminal 923 may operate using control circuitry 916. In another aspect, the terminal 923 optionally communicates directly with bet database 912, account info database 913, historical events database 929, prize configuration database 914, and payout pools 915.

In this example, terminal 923 is configured to accept wager input, and interact directly with the disclosed databases in order to provide the disclosed live pari-mutuel wagering on one or more historical events. In another aspect, multiple terminals configured according to the example at 1200 may collaborate together thus operating in a "peer-to-peer" architecture without requiring a central server to coordinate the betting activities. The disclosed databases 912, 913, 914, 915, and 929, may optionally be included with the terminal 923. For example, multiple terminals 923 may include multiple separate copies of the databases which are configured and arranged to automatically synchronize with one another as needed to maintain accurate account, bet, prize, and payout information.

Figure 13:
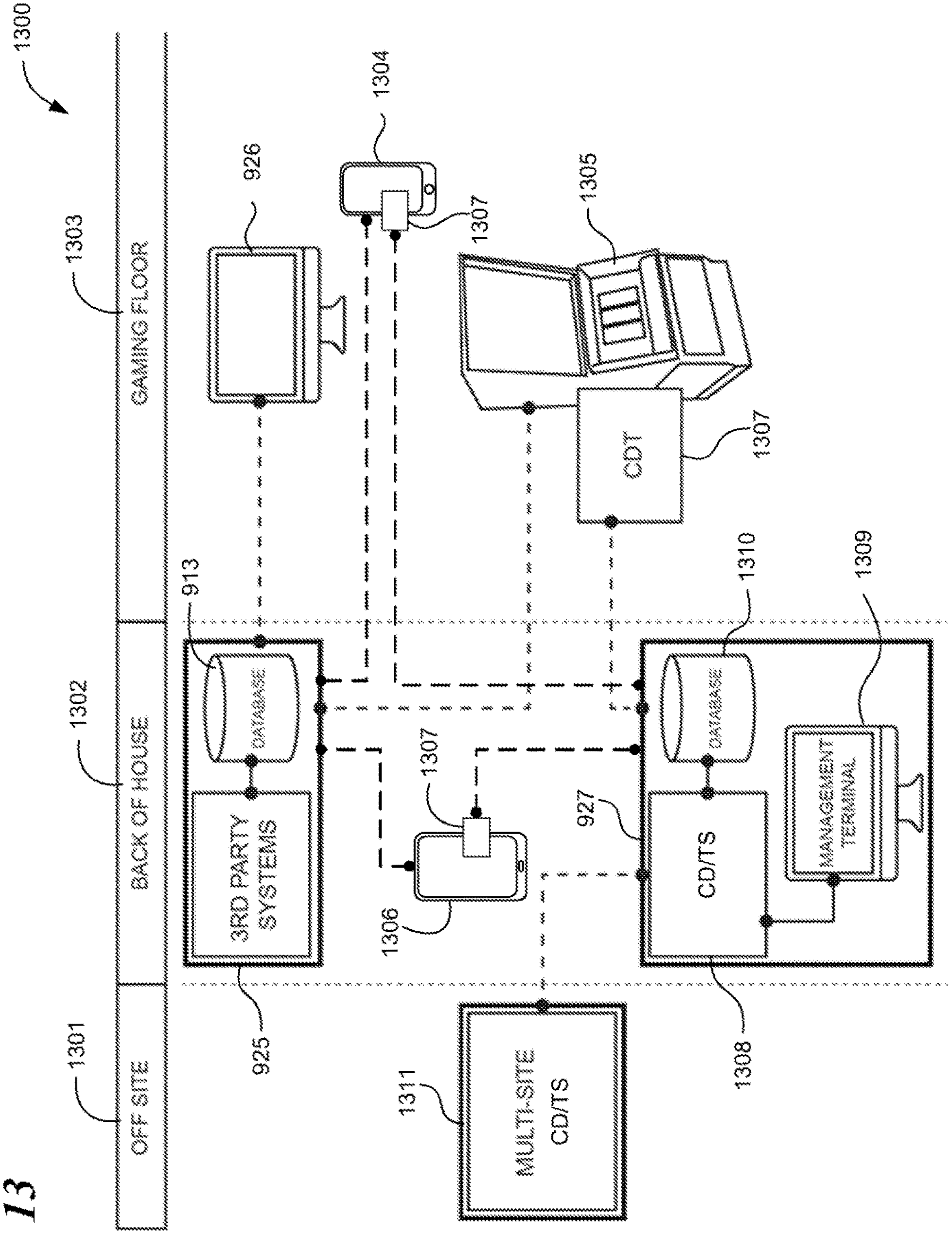

At 1300 in FIG. 13 is another example of the disclosed system illustrating additional aspects of how the disclosed components may be integrated together in a gaming venue to provide the disclosed services. The account management terminal 926 may access an account management server 925 which optionally includes an account database 913. This access may be facilitated by a communication link which may include a computer network as discussed herein. Different examples of the wager terminal like those disclosed herein are illustrated, and they include a terminal implemented on a smart phone 1304, a terminal implemented on a tablet 1306, or a terminal implemented as a kiosk 1305 in a separate physical enclosure. Any of the terminals 1304-1306 may include a Central Determinate Translator (CDT) module 1307 which may implement the functionality of the Central Determinant/Totalisator Server 927 either in hardware, or in software, or in any suitable combination thereof. Wager terminals 1304-1306 may be positioned along with the account management terminal 926 on the gaming floor 1303 of a gaming venue. Gaming floor 1303 may be the area accessible to users of the gaming system described herein.

The wagering terminals may communicate via communication links to the central determinant/totalizator server 927. Server 927 may include a database 1310 which may include any suitable combination of the databases 903. Server 927 may also include a Central Determinate/Translator System (CD/TS) 1308, and optionally, a management terminal 1309 configured to allow system managers to maintain rules, information about past events, math model definitions, and any other logic or data used by the system as discussed herein elsewhere. Server 927, CD/TS 1308, and management terminal 1309 may be positioned in a "back of house" area 1302 of a venue available to administrative or other employees of the venue. This area may also include account management server 925 and/or account management database 913. Server 926 and 925 may be maintained in a separate location within a venue or in a separate location remote from the venue accessible to terminals 1304-1306.

Terminals 1304-1306 may include a CDT module 1307 communicating with CD/TS servers 1308 and/or 1311. The CDTS servers and module 1307 may be configured to provide gaming infrastructure that both simplifies operations for the gaming facility and simplifies development for gaming equipment manufacturers. In some cases, a software emulator of the CDT hardware may be incorporated in terminals 1304-1306, or other components, such as via module 1307. The CDT functionality may be included with the CDTS and deployed in a variety of server and software configurations to meet various jurisdictional requirements. These configurations can include Class II Bingo, Virtual Scratch Tickets, Historical Racing, Racing Based Gaming and variants that utilize previously run races to generate outcomes, and/or other forms of central determinate gaming.

As illustrated FIG. 13, wagering terminals may include a cabinet, computer, display, input/output devices, and other peripherals. The computer may be programmed with software configured to carry out the methods and processes disclosed herein, and may optionally be programmed to perform other processes as well. Unlike traditional wagering terminals that include an internal random prize generator, terminals 1304-1306 may include a central determinate gaming logic or equipment programmed to receive prize outcomes from an external device or system. The CDT aware servers 926 and 925, and others, can cooperate to manage account balances, communicate with the system, display user interface screens or other information, and display outcomes calculated by the system in an entertaining way. This may be done using a variety of add on components available to system operators to enhance manageability and guest experience. These include accounting systems and player rewards systems. These systems may connect to wagering terminals such as terminals 1304-1306 directly or through a server such as server 927 using one or more communication links depending on the specific capabilities of the systems and devices provided by various vendors.

Other examples of the disclosed concepts include the following numbered examples:

Example 1

A method, comprising retrieving past event data about multiple historical events that occurred in the past using one or more processors, wherein the past event data includes final rankings for event participants, wherein the final ranking of the event participants indicates the outcome for the event participant with respect to other event participants who competed in the same event; retrieving an execution time using the one or more processors, wherein the execution time is a time in the future; prior to the execution time, determining at least one predicted final ranking for participants of the events using the one or more processors; on or after the execution time, obtaining a final outcome using the one or more processors, wherein the final outcome is based on a combination of differences between the predicted final ranking for participants of the multiple historical events and corresponding final rankings for the event participants; rendering a graphical representation of at least a portion of the data about at least one of the multiple historical events using the one or more processors; and displaying the graphical representation using a display device.

Example 2

The method of Example 1, wherein the historical events are retrieved from a remote server that is accessible via a computer network.

Example 3

The method of Example 1, wherein the execution time is obtained from a remote server that is accessible via a computer network.

Example 4

The method of Example 1, comprising: prior to the execution time, prepopulating the predicted final rankings for the event participants using an initial ranking generated by the one or more processors; and displaying the predicted final rankings using the display device Example 5

The method of Example 4, comprising: accepting input from the input device changing the predicted final ranking for at least one of the event participants.

Example 6

The method of Example 1, wherein determining at least one predicted final ranking includes accepting input from an input device.

Example 7

The method of Example 1, wherein determining at least one predicted final ranking includes using the one or more processors to automatically generate the at least one predicted final ranking.

Example 8

The method of Example 1, comprising: accepting a wager amount defining an amount of a currency to wager using the input device.

Example 9

The method of Example 1, comprising: obtaining a final prize amount, wherein the final prize amount is a currency that is based on the final outcome.

Example 10

The method of Example 9, wherein obtaining the final prize amount includes requesting the final prize amount from a remote server that is accessible via a computer network.

Example 11

The method of Example 10, wherein the final prize amount is calculated by the remote server according to a probability of occurrence assigned to the final outcome, and wherein a probability of occurrence that is greater than or equal to a predetermined threshold results in a non-zero prize amount.

Example 12

The method of Example 10, wherein the prize amount is calculated by the remote server according to the probability of occurrence assigned to the final outcome, and wherein a probability of occurrence that is less than a predetermined threshold results in a zero prize amount.

Example 13

The method of Example 9, comprising: accepting input from the input device defining a request to transfer at least a portion of the final prize from a prize pool.

Example 14

The method of Example 1, wherein the events are team competitions, wherein the participants are teams of individual competitors, wherein the predicted ranking is a predicted outcome for the team in each of the team competitions, and wherein the final ranking is the actual outcome for the teams competing in their respective team competitions.

Example 15

The method of Example 1, wherein the multiple historical events are horse races, wherein the participants are horses, wherein the predicted final ranking is determined according to input obtained using the input device, and wherein the final ranking is based on actual finishing positions of the horses.

Example 16

The method of Example 1, wherein the multiple historical events are horse races, wherein the participants are horses, wherein the predicted final ranking is automatically generated using the one or more processors, and wherein the final ranking is based on actual finishing positions of the horses.

Example 17

The method of Example 14, wherein the past event data includes data about horse races that includes a race with at least 6 horse fields, where no horses scratched from the race, where there were no dead heats, where there were no coupled entries, and where all horses finished the race.

Example 18

The method of Example 1, wherein rendering the graphical representation of at least a portion of the data comprises: rendering an animated replay of at least a portion of one of the multiple historical events using the one or more processors; and using the one or more processors to control the display device to display the animated replay.

Example 19

The method of any preceding Example, wherein the input device includes a touch screen mounted in a terminal and coupled to the one or more processors, wherein at least one of the one or more processors is mounted in the terminal.

Example 20

The method of Example 19, wherein the terminal is a personal computing device.

Example 21

The method of Example 19, wherein the terminal includes a wager input device configured to accept transaction information and an amount to be wagered.

Example 22

The method of Example 19, wherein the past event data is stored in an electronic storage device mounted within the terminal.

Example 23

The method of Example 1, comprising: using the processor to control a display device to display a video representation of at least a portion of one of the multiple historical events on the display device.

Example 24

The method of any preceding Example, wherein obtaining the final outcome includes sending the predicted final rankings to a remote server that is accessible via a computer network, and afterward receiving the final outcome from the remote server.

Example 25

The method of any preceding Example, wherein the past event data includes data about at least two separate events that occurred in the past.

Example 26

A method, comprising: retrieving historical event data for events that occurred in the past using one or more processors, wherein the historical event data includes final rankings for event participants, wherein the final ranking of the event participants indicates the outcome for the event participant with respect to other event participants who competed in the same event; creating a bet using the one or more processors, the bet including: bet event data that includes the participants of at least two of the events that occurred in the past; and an execution time for the outcome of the bet to be decided that is in the future; prior to the execution time, accepting input from one or more remote terminals defining at least one predicted final ranking for participants included in the bet event data using the one or more processors, wherein the one or more remote terminals are accessible via a computer network; on or after the execution time, calculating a final outcome using the one or more processors, wherein the final outcome is calculated based on a combination of differences between the at least one predicted final ranking and the corresponding final rankings for the event participants of the bet event data; and after the execution time, providing the final outcome to the one or more remote terminals.

Example 27

The method of Example 26, comprising rendering a graphical representation of at least a portion of the bet event data using the one or more processors; and providing the graphical representation to the one or more remote terminals.

Example 28

The method of Example 26, comprising providing a video representation of at least a portion of one of the gave event data to the one or more remote terminals.

Example 29

The method of Example 26, comprising providing the bet event data and the execution time to the one or more remote terminals.

Example 30

The method of Example 26, wherein the input obtained from the one or more remote terminals includes input received from an input device of at least one of the terminals.

Example 31

The method of any one of Examples 26-30, wherein creating a bet includes determining initial rankings for the participants of the of events in the bet event data using the one or more processors.

Example 32

The method of Example 31, wherein determining the initial rankings includes using the one or more processors to automatically generate the initial rankings.

Example 33

The method of any one of Examples 26-32, comprising using the one or more processors to initiate a transfer of at least a portion of a wager amount into a prize pool.

Example 34

The method of any one of Examples 26-33, comprising calculating a final prize amount for the bet using the one or more processors, wherein the final prize amount is based on a combination of differences between the at least one predicted final ranking and the corresponding final rankings for the event participants of the bet event data; and providing the final outcome to the one or more remote terminals.

Example 35

The method of Example 34, wherein the prize amount is calculated using a probability of occurrence assigned to the final outcome, and wherein a probability of occurrence that is greater than or equal to a predetermined threshold results in a non-zero prize amount.

Example 36

The method of Example 34, wherein the prize amount is calculated using the probability of occurrence assigned to the final outcome, and wherein a probability of occurrence that is less than a predetermined threshold results in a zero prize amount.

Example 37

The method of any one of Examples 26-36, wherein the events are team competitions, wherein the participants are teams of individual competitors, wherein the predicted ranking is a predicted outcome for the team in each of the team competitions, and wherein the final ranking is the actual outcome for the teams competing in their respective team competitions.

Example 38

The method of any one of Examples 26-37, wherein the multiple historical events are horse races, wherein the participants are horses, and wherein the final ranking is based on actual finishing positions of the horses.

Example 39

The method of Example 38, wherein the past event data includes data about horse races that includes a race with at least 6 horse fields, where no horses scratched from the race, where there were no dead heats, where there were no coupled entries, and where all horses finished the race.

Example 40

The method of any one of Examples 26-39, wherein the one or more remote terminals include a personal computing device.

Example 41

The method of any one of Examples 26-40, wherein the one or more remote terminals includes a wager input device configured to accept an amount to be wagered.

Example 42

The method of any one of Examples 26-41, wherein the historical event data is stored in a remote database accessible via the computer network.

Example 43

The method of any one of Examples 26-42, wherein the historical event data includes data about at least two separate events that occurred in the past.

Example 44

The method of any one a Examples 26-43, wherein obtaining the final outcome includes sending the predicted final rankings to a remote server that is accessible via a computer network, and afterward receiving the final outcome from the remote server.

Example 45

The method of any one of Examples 26-44, wherein the past event data includes data about at least two separate events that occurred in the past.

Example 46

The method of any one of Examples 26-45, comprising calculating the execution time based on a predetermined schedule of bet event times.

Example 47

The method of any one of Examples 26-46, comprising calculating a cut-off time after which no further input from the one or more terminals is accepted.

Example 48

The method of any one of Examples 26-47, wherein the input selecting the predicted outcome for the participants of the multiple separate events is received from multiple separate computing devices operated by multiple separate users in different locations.

Glossary of Definitions and Alternatives

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms “a”, “an”, “the”, and the like include plural referents unless expressly discussed otherwise. As an illustration, references to “a device” or “the device” include one or more of such devices and equivalents thereof.

Directional terms, such as “up”, “down”, “top” “bottom”, “fore”, “aft”, “lateral”, “longitudinal”, “radial”, “circumferential”, etc., are used herein solely for the convenience of the reader in order to aid in the reader’s understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple “laterally extending elements” 90A, 90B, 90C, and 90D are illustrated in the drawings, the disclosure may refer to these as “laterally extending elements 90A-90D,” or as “laterally extending elements 90,” or by a distinguishable portion of the full name such as “elements 90”.

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster’s and Random House dictionaries. As used herein, the following definitions apply to the following terms or to common variations thereof (e.g., singular/plural forms, past/present tenses, etc.):

“About” with reference to numerical values generally refers to plus or minus 10% of the stated value. For example, if the stated value is 4.375, then use of the term “about 4.375” generally means a range between 3.9375 and 4.8125.

“Activate” generally is synonymous with “providing power to”, or refers to “enabling a specific function” of a circuit or electronic device that already has power.

“And/or” is inclusive here, meaning “and” as well as “or”. For example, “P and/or Q” encompasses, P, Q, and P with Q; and, such “P and/or Q” may include other elements as well.

“Bill acceptor”, “currency detector”, or “currency validator” generally refers to any device configured to automatically scan paper or metal currency to determine the denominations scanned as well as whether the currency is genuine or counterfeit. Such devices are generally configured and programmed to perform various tests, to determine if the nominations of the currency and whether or not it is counterfeit. In operation, if the bill or coin is considered genuine, it is accepted and retained within the machine and its amount calculated. If the bill or coin deemed counterfeit or otherwise rejected by the machine, it is generally returned to the customer by dropping the currency into a receptacle for retrieval, or by injecting the currency from a slot or opening within which it was initially placed for examination. Various techniques may be employed for sensing whether currency is counterfeit such as magnetic or optical sensing for various physical or other properties of the currency such as weight, size, response to ultraviolet light, and/or the shape or position of particular patterns printed or imprinted in the currency.

"Controller" or "control circuit" generally refers to a mechanical or electronic device configured to control the behavior of another mechanical or electronic device. A controller or "control circuit" is optionally configured to provide signals or other electrical impulses that may be received and interpreted by the controlled device to indicate how it should behave.

"Communication Link" generally refers to a connection between two or more communicating entities and may or may not include a communications channel between the communicating entities. The communication between the communicating entities may occur by any suitable means. For example, the connection may be implemented as an actual physical link, an electrical link, an electromagnetic link, a logical link, or any other suitable linkage facilitating communication.

In the case of an actual physical link, communication may occur by multiple components in the communication link configured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum.

A communication link may include any suitable combination of hardware which may include software components as well. Such hardware may include routers, switches, networking endpoints, repeaters, signal strength enters, hubs, and the like.

In the case of a logical link, the communication link may be a conceptual linkage between the sender and recipient such as a transmission station in the receiving station. Logical link may include any combination of physical, electrical, electromagnetic, or other types of communication links.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus, a computer may include one or more physical processors or other computing devices or circuitry and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Coupled entry" generally refers to two or more horses owned or trained by the same person or entity that are in the starting field for the same horse race and are grouped together for wagering purposes.

"Dead heat" generally refers to a tie between final rankings for two or more participants in an event such as a sporting event. For example, a "dead heat" in horse racing is where two or more horses tie for a "win" or "placing" (first or second place).

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database" also referred to as a "data store", "data repository", or "knowledge base" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data).

In another aspect, the DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS.

In another aspect, a database may implement "smart contracts" which include rules written in computer code that automatically execute specific actions when predetermined conditions have been met and verified. Examples of such actions include, but are not limited to, releasing funds to the appropriate parties, registering a vehicle, sending notifications, issuing a certificate of ownership transfer, and the like. The database may then be updated when the transactions specified in the rules encoded in the smart contract are completely executed. In another aspect, the transaction specified in the rolls may be irreversible and automatically executed without the possibility of manual intervention. In another aspect, only parties specified in the rules of the smart contract who have been granted permission may be notified or allowed to see the results.

Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, chained model (such as in the case of a "blockchain" database), the "object-relational" model, the "file", "indexed file" or "flat-file" models, the "hierarchical" model, the "network" model, the "document" model, the "XML" model using some variation of XML, the "entity-attribute-value" model, and others.

Examples of commercially available database management systems include PostgreSQL provided by the PostgreSQL Global Development Group; Microsoft SQL Server provided by the Microsoft Corporation of Redmond, Washington, USA; MySQL and various versions of the Oracle DBMS, often referred to as simply "Oracle" both separately offered by the Oracle Corporation of Redwood City, California, USA; the DBMS generally referred to as "SAP" provided by SAP SE of Walldorf, Germany; and the DB2 DBMS provided by the International Business Machines Corporation (IBM) of Armonk, New York, USA.

The database and the DBMS software may also be referred to collectively as a "database". Similarly, the term "database" may also collectively refer to the database, the corresponding DBMS software, and a physical computer or collection of computers. Thus the term "database" may refer to the data, software for managing the data, and/or a physical computer that includes some or all of the data and/or the software for managing the data.

"Display device" generally refers to any device capable of being controlled by an electronic circuit or processor to display information in a visual or tactile. A display device may be configured as an input device taking input from a user or other system (e.g. a touch sensitive computer screen), or as an output device generating visual or tactile information, or the display device may configured to operate as both an input or output device at the same time, or at different times.

The output may be two-dimensional, three-dimensional, and/or mechanical displays and includes, but is not limited to, the following display technologies: Cathode ray tube display (CRT), Light-emitting diode display (LED), Electroluminescent display (ELD), Electronic paper, Electrophoretic Ink (E-ink), Plasma display panel (PDP), Liquid crystal display (LCD), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, an array of red, yellow, and green indicators configured to indicate a temperature range.

"Electronic funds transfer" generally refers to the electronic exchange or transfer of money from one account to another, either within a single financial institution or across multiple institutions, through computer-based systems. Examples include cardholder-initiated transactions, using a payment card such as a credit or debit card; direct deposit payment initiated by the payer; direct debit payments, sometimes called electronic checks, for which a business debits the consumer's bank accounts for payment for goods or services; wire transfer via an international banking network such as the Society for Worldwide Interbank Financial Telecommunication (SWIFT); electronic bill payment in online banking, which may be delivered by EFT or paper check; transactions involving stored value of electronic money, possibly in a private currency.

"Electrically connected" generally refers to a configuration of two objects that allows electricity to flow between them or through them. In one example, two conductive materials are physically adjacent one another and are sufficiently close together so that electricity can pass between them. In another example, two conductive materials are in physical contact allowing electricity to flow between them.

"Event" generally refers to something that has happened, is happening, or will happen. Examples include a planned public or private social occasion such as an organized activity involving physical exertion and skill in which an individual or team competes against another, or others, for entertainment purposes. This may be referred to as a "sporting event". The term may also include each of several particular contests making up an overall sports competition. For example, multiple track and field "events" may be part of a larger competitive "sporting event" such as the Olympics.

In one example, an event may include one or more participants engaging in any sort of activity to determine a final ranking of participants relative to other participants engaging in the same event. The final ranking or outcome is generally calculated when the event is completed, although partial or interim rankings may be calculated as the event is occurring, particularly for longer events. Examples of "events" include various types of sporting events with individual participants competing directly against one another (e.g. a horse race, automobile race, tennis match, chess match, bridge match, and the like). Other events include sports events with multiple participants competing in groups as a team such as in baseball, cricket, soccer, American-style football, basketball, or relay races such as a 400 m relay performed in the context of a track-and-field or swimming competition.

Events commonly include competitive mental or physical activity which aim to use, maintain, or improve the competitors' physical or mental ability and skills while providing entertainment to participants and/or spectators. Many sports exist which include events occurring at different times and include events requiring only two participants to events with hundreds of simultaneous participants, either in teams or competing as individuals.

Sports and associated events are generally governed by a set of rules or customs which serve to provide for fair competition and a consistent method for determining a winner. Winning can be determined by physical events such as scoring goals or crossing a line first, or by the determination of judges who are scoring elements of the performance, including objective or subjective measures such as technical performance or artistic impression.

Records of performance are often kept and this information may be widely announced or reported. In addition, sports events are a major source of entertainment for non-participants. Some spectators may also place wagers on the outcome of a sporting event, or on the performance of an individual participant or team performing in a sports event.

"File" generally refers to a collection of data stored as a unit that is identifiable by the computer as a separate entity distinguishable from other files or resources. A file may be identifiable by means of a "file name" or other unique identifying features such as its location in a "file system" useful for organizing and locating files.

A file may be designated to store data of a particular type such as an image, an email or SMS message, a video, an executable computer program, or any of a wide array of other kinds of data, or any combination thereof. For example, a file may store a digital asset or an NFT. A file optionally enables a user to open, read, change, edit, save, and/or view the contents of the file. Viewing and editing the contents may be enabled by use of an executable program running on a computer such as in the case of a document editor or image viewer program.

"Horse race" generally refers to any race or other sporting event where horses participate in the event. In such events, horses may be listed as the participants in the event. Examples include, but are not limited to, Thoroughbred, Quarter horse, and Standardbred racing.

"Identifier" generally refers to a name that identifies (that is, labels the identity of) either a unique thing or a unique class of things, where the "object" or class may be an idea, physical object (or class thereof), or physical substance (or class thereof). The abbreviation "ID" often refers to identity, identification (the process of identifying), or an identifier (that is, an instance of identification). An identifier may or may not include words, numbers, letters, symbols, shapes, colors, sounds, or any combination of those.

The words, numbers, letters, or symbols may follow an encoding system (wherein letters, digits, words, or symbols represent ideas or longer identifiers) or they may simply be arbitrary. When an identifier follows an encoding system, it is often referred to as a code or ID code. Identifiers that do not follow any encoding scheme are often said to be arbitrary IDs because they are arbitrarily assigned without meaning in any other context beyond identifying something.

"Input Device" generally refers to any device coupled to a computer that is configured to receive input and deliver the input to a processor, memory, or other part of the computer. Such input devices can include keyboards, mice, trackballs, touch sensitive pointing devices such as touchpads, or touchscreens. Input devices also include any sensor or sensor array for detecting environmental conditions such as temperature, light, noise, vibration, humidity, and the like.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Module" or "Engine" generally refers to a collection of computational or logic circuits implemented in hardware, or to a series of logic or computational instructions expressed in executable, object, or source code, or any combination thereof, configured to perform tasks or implement processes. A module may be implemented in software maintained in volatile memory in a computer and executed by a processor or other circuit. A module may be implemented as software stored in an erasable/programmable nonvolatile memory and executed by a processor or processors. A module may be implanted as software coded into an Application Specific Information Integrated Circuit (ASIC). A module may be a collection of digital or analog circuits configured to control a machine to generate a desired outcome.

Modules may be executed on a single computer with one or more processors, or by multiple computers with multiple processors coupled together by a network. Separate aspects, computations, or functionality performed by a module may be executed by separate processors on separate computers, by the same processor on the same computer, or by different computers at different times.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a low power wireless Personal Area Network using IPv6 (6LoWPAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer.

"Odds" generally refers to a numerical expression indicating a ratio of the amounts staked by parties on opposite sides of a wager, or the amounts an odds maker is predicting will be staked by parties on opposing sides of a wager.

For example, the odds may be 2-1 of a participant finishing an event with a final ranking of 1 (i.e., the highest finishing position). This indicates that the possibility that this participant would achieve that highest rank merits a return to the bettor of $2 in winnings for every $1 wagered. In a pari-mutuel pool environment, this would mean that if the participant finishes the event with the highest ranking, a bet of $2 would return a payout of $6-$4 in winnings plus the original stake of $2. In another example, if the odds of the participant finishing with the highest ranking are 1-1, a $2 bet would return a payout of $4 ($2 in winnings plus the original $2 bet). In yet another example, at 3-1 odds of finishing with the highest ranking, a $2 bet would return $8 ($6 in winnings plus the original $2 bet) if that participant were to finish in the highest position.

"Optionally" as used herein means discretionary; not required; possible, but not compulsory; left to personal choice.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projector a projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Pari-mutuel betting" generally refers to a betting system in which all bets of a particular type are placed together in a common pool (or multiple separate common pools). Taxes and the "house-take" or "take-out" are removed, and payoff odds are calculated by sharing the common pool among all winning bets. A totalizator can be used to manage the odds, pools, payouts, and other aspects of pari-mutuel betting.

Pari-mutuel betting differs from "fixed-odds betting" in that the final payout varies based on the size of the pool and the amounts wagered on various outcomes. In contrast, with fixed odds betting where the payout is agreed at the time the bet is made.

"Past Event" generally refers to an event that has reached its conclusion and thus was terminated at some time prior to the moment in time under consideration. A past event may thus refer to an event that was completed less than a second ago, less than a minute ago, less than five hours ago, less than a month ago, or a month ago or more. As such, this precludes events or activities that have not yet started, or have not reached their conclusion as of the moment of consideration.

"Personal computing device" generally refers to a computing device configured for use by individual people. Examples include mobile devices such as Personal Digital Assistants (PDAs), tablet computers, wearable computers installed in items worn on the human body such as in eyeglasses, watches, laptop computers, portable music/video players, computers in automobiles, or cellular telephones such as smart phones. Personal computing devices can be devices that are typically not mobile such as desk top computers, game consoles, or server computers. Personal computing devices may include any suitable input/output devices and may be configured to access a network such as through a wireless or wired connection, and/or via other network hardware.

"Portion" means a part of a whole, either separated from or integrated with it.

"Predominately" as used herein is synonymous with greater than 50%.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, California, USA. Other examples of commercially available processors include but are not limited to the X8 and Freescale Coldfire processors made by Motorola Corporation of Schaumburg, Illinois, USA; the ARM processor and TEGRA System on a Chip (SoC) processors manufactured by Nvidia of Santa Clara, California, USA; the POWER7 processor manufactured by International Business Machines of White Plains, New York, USA; any of the FX, Phenom, Athlon, Sempron, or Opteron processors manufactured by Advanced Micro Devices of Sunnyvale, California, USA; or the Snapdragon SoC processors manufactured by Qalcomm of San Diego, California, USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Remote" generally refers to physical separation or interval. The term may as used herein does not naturally imply a larger than usual physical separation. A separation of less than 10 feet may be thought of as "remote", as would a separation of greater than 10 feet, greater than 10,000 miles, or greater than a light year.

"Replay" generally refers to presenting a representation of a past event using any suitable technology. A replay may involve rendering and/or displaying a video recording of the event that may include actual footage of the event as it occurred in the past. A replay may include rendering and/or displaying an animated representation of the event or the outcome of the event, or any other later recreation of the event after it has taken place. Digital, analog, or computer generated representations may be rendered using any suitable technology or devices, or by any combination thereof. A replay may include audible representations of the event results as well such as recorded audio that may be integrated with or separate from a video or other graphical representation.

"Rule" generally refers to a conditional statement with at least two outcomes. A rule may be compared to available data which can yield a positive result (all aspects of the conditional statement of the rule are satisfied by the data), or a negative result (at least one aspect of the conditional statement of the rule is not satisfied by the data). One example of a rule is shown below as pseudo code of an "if/then/else" statement that may be coded in a programming language and executed by a processor in a computer:

```
if(clouds.areGrey( ) and
(clouds.numberOfClouds > 100)) then {
   prepare for rain;
} else {
   Prepare for sunshine;
}
```

"Scratch" generally refers to removing a participant from an event before the event occurs. For example, a horse is said to "scratch" from a horse race if the horse is removed from the lineup before the race is run.

"Statistical odds" generally refers to a numerical expression of the chance of a predicted outcome occurring. Odds in statistics are sometimes represented as a percentage, decimal number, or in a written form. For example, the odds of rolling a two with a fair die may be expressed as being about 16.7%, 0.166666, or simply "one chance in six. "Odds against" may be used to express the likelihood that a particular event will not take place.

"Terminal" generally refers to a device or assembly of multiple devices that a user directly interacts with in order to make assets (e.g. money) available for making bets, placing the actual bets themselves, and otherwise managing the betting process. Examples of terminals include machines with any suitable combination display devices, input devices, processors, memory, and bill acceptors for taking money to wager. Such machines may be located in a betting facility at a location where the events bettors are betting on are currently taking place, or have taken place in the past (e.g. a horse racing track in the case of betting on horse racing, or casino in the case of events such as boxing matches that take place in the casino). These devices may be configured to manage the betting process, or may execute software configuring the device to facilitate the betting process.

Another example of a terminal is a personal or handheld computing device such as a smart phone, tablet, a desktop or laptop personal computer, and the like, executing software configuring the device to facilitate the betting process. Such devices may include or be coupled to processors, memory, and/or input, output, and display devices such as keyboards, mice, printers, barcode scanners, and various kinds of touch sensitive devices such as a touch sensitive display device, or a separate touch sensitive pad. Such devices may include a network interface or other networking hardware controlled by the processor that allows the device to be coupled to a computer network either wirelessly or through any other suitable device or media. Devices with these features or attached equipment may collectively be considered a "terminal" where the devices include software configured to execute the betting process. In this example, the terminal may also be remote from the location where the event being bet is taking place, or has already taken place in the past.

"Totalizator" or "Totalisator" generally refers to a system that may include hardware, software, communications equipment, input, output, and other electronic devices configured to accept and process the cashing of wagers, calculate the odds and prices of the wagers, and record, display, and store pari-mutuel wagering information.

A totalizator system may include the following aspects:

1. Collecting bets from players (registers bets), for example, from wagering terminals.
2. Separating player bets into a commission for the operator and multiple prize pools for players to win (depending on the wager and math model chosen by the player).
3. Awarding winning players an amount of the appropriate prize pool commensurate with the winning event achieved by the player (and divides total amount bet among those who won).
4. Maintaining records of pari-mutuel wager events, outcomes, and activity.
5. Providing accounting reports and management terminals to manage all aspects of the system.

"Triggering a Rule" generally refers to an outcome that follows when all elements of a conditional statement expressed in a rule are satisfied. In this context, a conditional statement may result in either a positive result (all conditions of the rule are satisfied by the data), or a negative result (at least one of the conditions of the rule is not satisfied by the data) when compared to available data. The conditions expressed in the rule are triggered if all conditions are met causing program execution to proceed along a different path than if the rule is not triggered.

"Wager" or "bet" generally refers to an amount of money or other valuable asset intentionally put at risk by the bettor with the intention of receiving a return of assets with a value in excess of the amount initially put at risk. "Wagering" or "betting" thus generally refers to any process by which a wager or bet is made, and the results calculated. Wagering generally includes the bettor making a prediction as to an outcome that either has not yet materialized, or has already materialized but is unknown to the bettor. If the outcome matches the prediction made by the bettor turns out to be correct, the result of placing the wager is to return to the bettor assets whose value generally exceeds the value of the asset put at risk. This "return" or "payout" may be accepted as physical currency such as actual paper money, casino chips or types of vouchers that can later be redeemed for actual currency, or by an electronic funds transfer into an account maintained by the bettor. If the predicted outcome does not turn out to be correct, the bettor generally loses some or all of the initial wager.

A wager may be placed based on any of a wide variety of outcomes such as the score of a particular sporting event, the performance of members of the team of participants participating in a sporting event, the position of individual competitors participating in an event such as a horse race, dog race, automobile race, and the like. Wagering may take place in the facility where the event is occurring (e.g. a track where horseracing is or has taken place), or wagers may be placed in one location based on events occurring, or that have occurred, in a separate geographical location.

What is claimed is:

1. A method, comprising:

retrieving historical event data for events that occurred in the past using one or more processors, wherein the historical event data includes final rankings for event participants, wherein the final ranking of the event participants indicates an outcome for the event participant with respect to other event participants who competed in the same event;

creating a bet using the one or more processors, the bet including:

bet event data that includes the participants of at least two of the events that occurred in the past; and an execution time for the outcome of the bet to be decided that is in the future;

prior to the execution time, accepting input from one or more remote terminals defining at least one predicted final ranking for participants included in the bet event data using the one or more processors, wherein the one or more remote terminals are accessible via a computer network;

on or after the execution time, calculating a final outcome using the one or more processors, wherein the final outcome is calculated based on a combination of differences between the at least one predicted final ranking and the corresponding final rankings for the event participants of the bet event data; and after the execution time, providing the final outcome to the one or more remote terminals.

2. The method of claim 1, comprising:

rendering a graphical representation of at least a portion of the bet event data using the one or more processors; and providing the graphical representation to the one or more remote terminals.

3. The method of claim 1, comprising:

providing a video representation of at least a portion of the bet event data to the one or more remote terminals.

4. The method of claim 1, comprising:

providing the bet event data and the execution time to the one or more remote terminals.

5. The method of claim 1, wherein the input obtained from the one or more remote terminals includes input received from an input device of at least one of the terminals.

6. The method of claim 1, comprising:

determining initial rankings for the participants of the events in the bet event data using the one or more processors.

7. The method of claim 6, wherein determining the initial rankings includes using the one or more processors to automatically generate the initial rankings.

8. The method of claim 1, comprising:

using the one or more processors to initiate a transfer of at least a portion of a wager amount into a prize pool.

9. The method of claim 1, comprising:

calculating a final prize amount using the one or more processors, wherein the final prize amount is based on a combination of differences between the at least one predicted final ranking and the corresponding final rankings for the event participants of the bet event data; and providing the final outcome to the one or more remote terminals.

10. The method of claim 9, wherein the prize amount is calculated using a probability of occurrence assigned to the final outcome, and wherein a probability of occurrence that is greater than or equal to a predetermined threshold results in a non-zero prize amount.

11. The method of claim 9, wherein the prize amount is calculated using the probability of occurrence assigned to the final outcome, and wherein a probability of occurrence that is less than a predetermined threshold results in a zero prize amount.

12. The method of claim 1, wherein the events are team competitions, wherein the participants are teams of individual competitors, wherein the predicted ranking is a predicted outcome for the team in each of the team competitions, and wherein the final ranking is the actual outcome for the teams competing in their respective team competitions.

13. The method of claim 1, wherein the historical event data includes multiple historical events are horse races, wherein the participants are horses, and wherein the final ranking is based on actual finishing positions of the horses.

14. The method of claim 13, wherein the past event data includes data about horse races that includes a race with at least 6 horse fields, where no horses scratched from the race, where there were no dead heats, where there were no coupled entries, and where all horses finished the race.

15. The method of claim 1, wherein the one or more remote terminals include a personal computing device.

16. The method of claim 1, wherein the one or more remote terminals includes a wager input device configured to accept an amount to be wagered.

17. The method of claim 1, wherein the historical event data is stored in a remote database accessible via the computer network.

18. The method of claim 1, wherein the historical event data includes data about at least two separate events that occurred in the past.

19. The method of claim 1, wherein obtaining the final outcome includes sending the predicted final rankings to a remote server that is accessible via a computer network, and afterward receiving the final outcome from the remote server.

20. The method of claim 1, wherein the past event data includes data about at least two separate events that occurred in the past.

21. The method of claim 1, comprising:

calculating the execution time based on a predetermined schedule.

22. The method of claim 1, comprising:

calculating a cut-off time after which no further input from the one or more terminals is accepted.

23. The method of claim 1, wherein the input selecting the predicted final rankings for the event participants is received from multiple separate computing devices operated by multiple separate users in different locations.

* * * * *